No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 1.

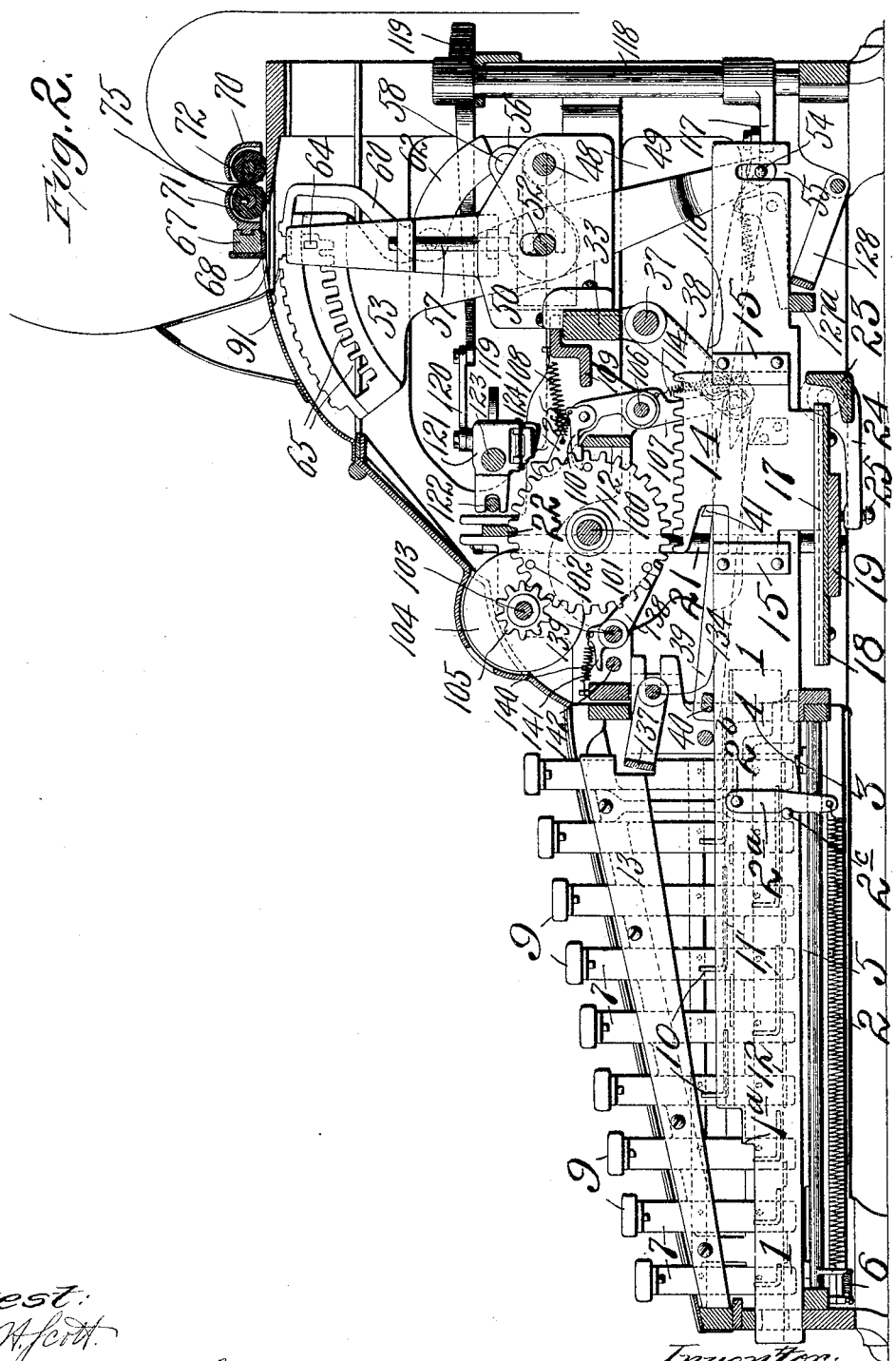

No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 3.
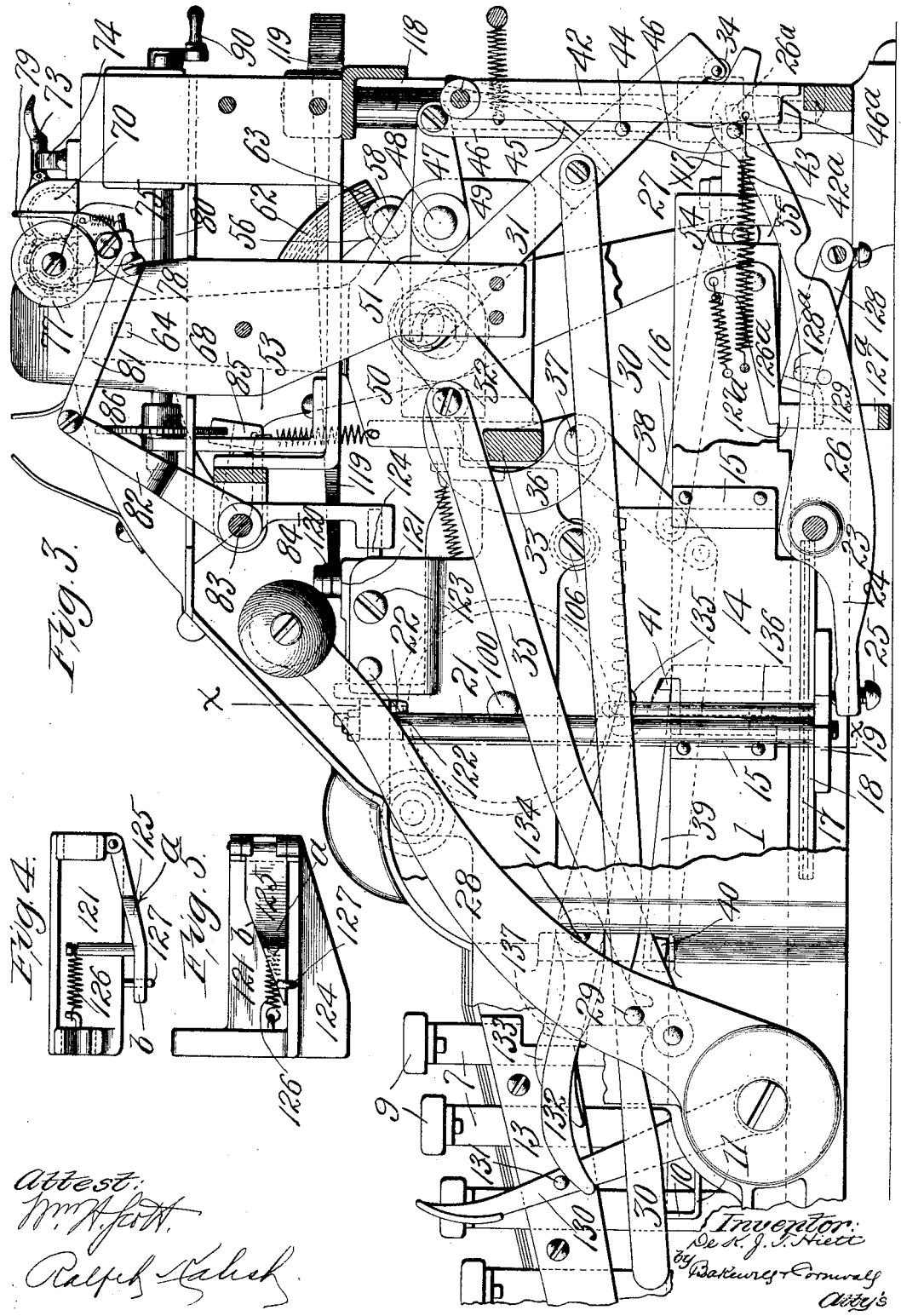

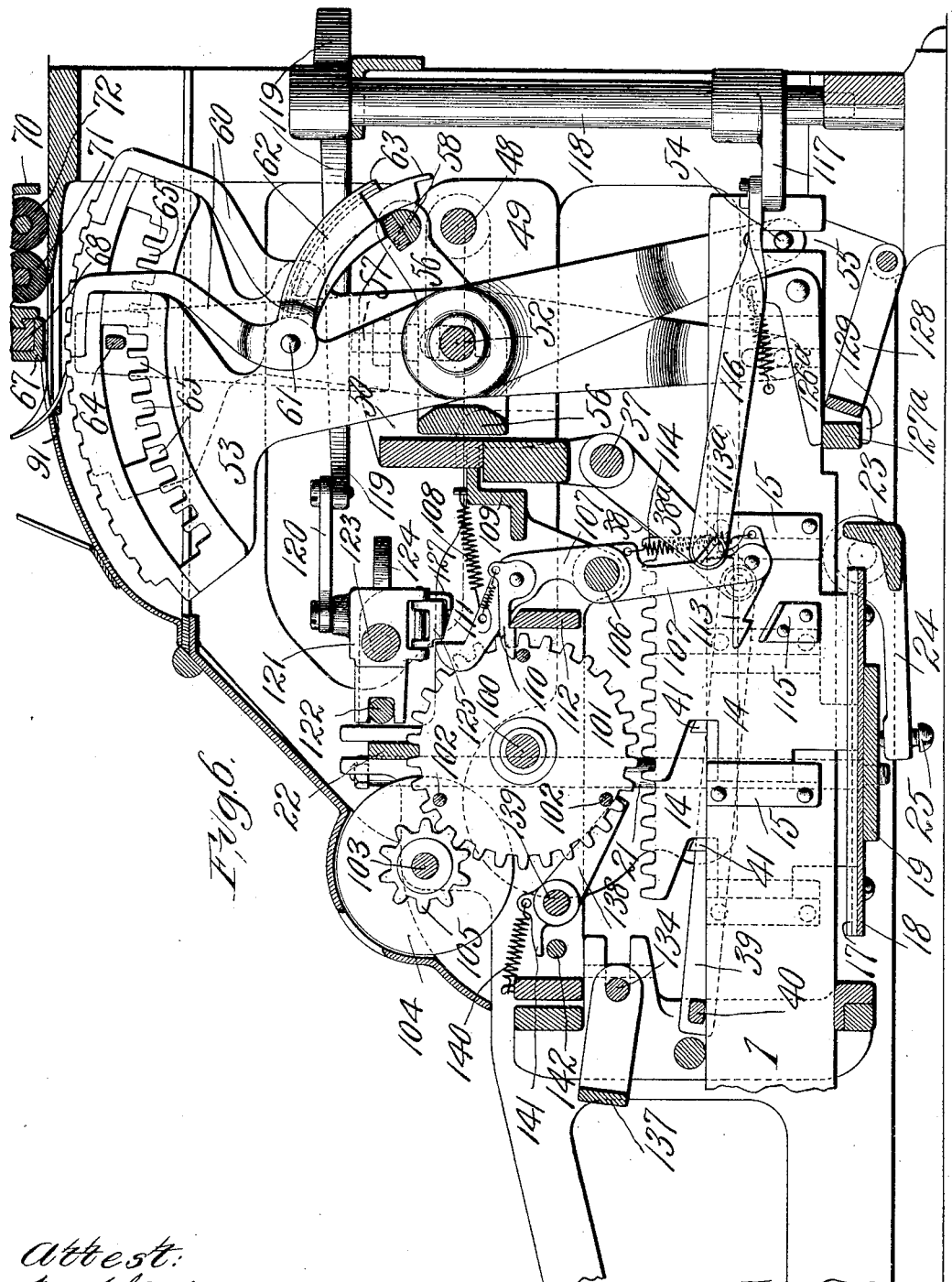

No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 5.

No. 638,118. Patented Nov. 28, 1899.
DE KERNIEA J. T. HIETT.
CALCULATING MACHINE.
(Application filed Nov. 26, 1897.)

(No Model.) 15 Sheets—Sheet 9.

Attest:
Inventor:
De K. J. T. Hiett

No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 10.

No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 11.
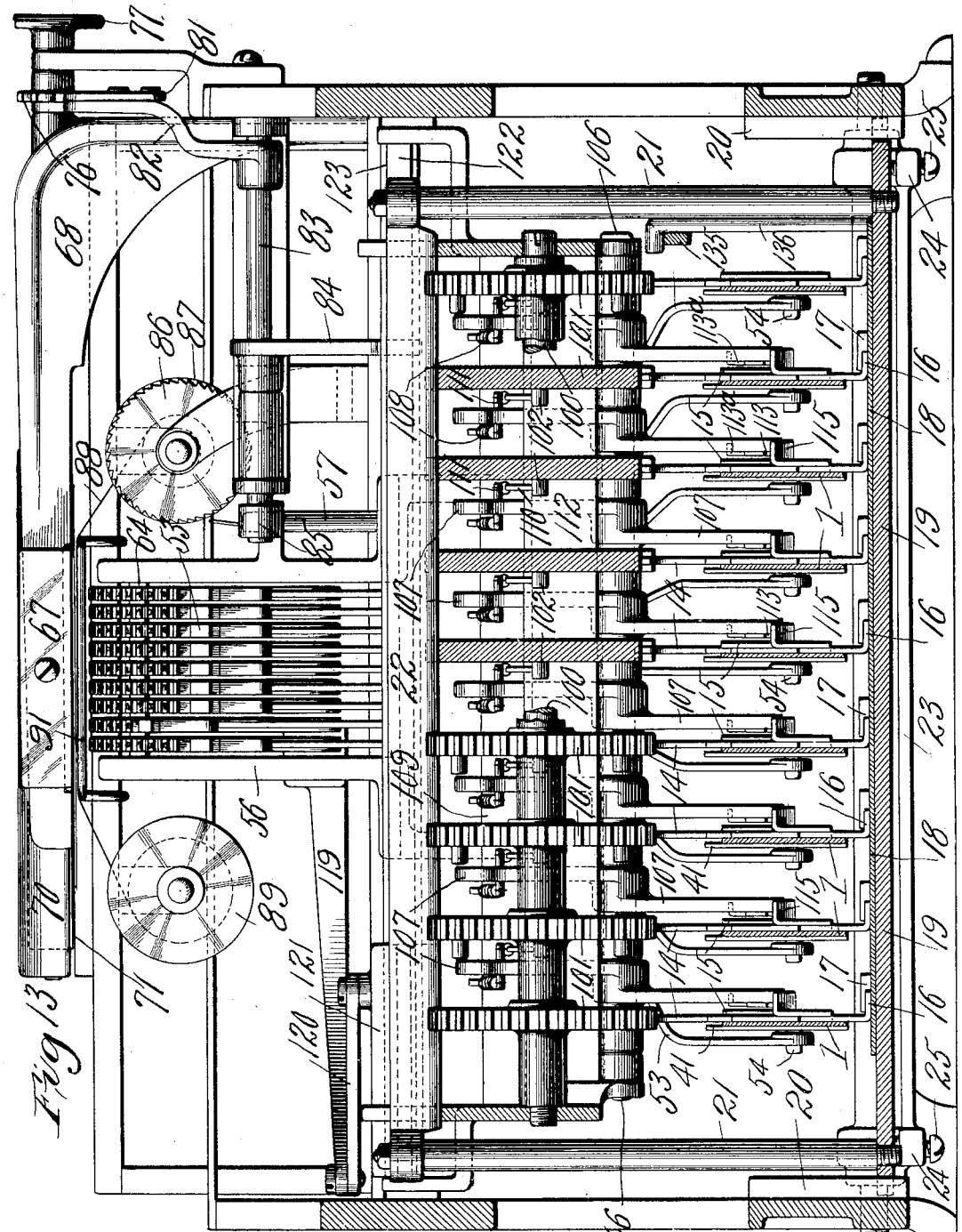

No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 12.
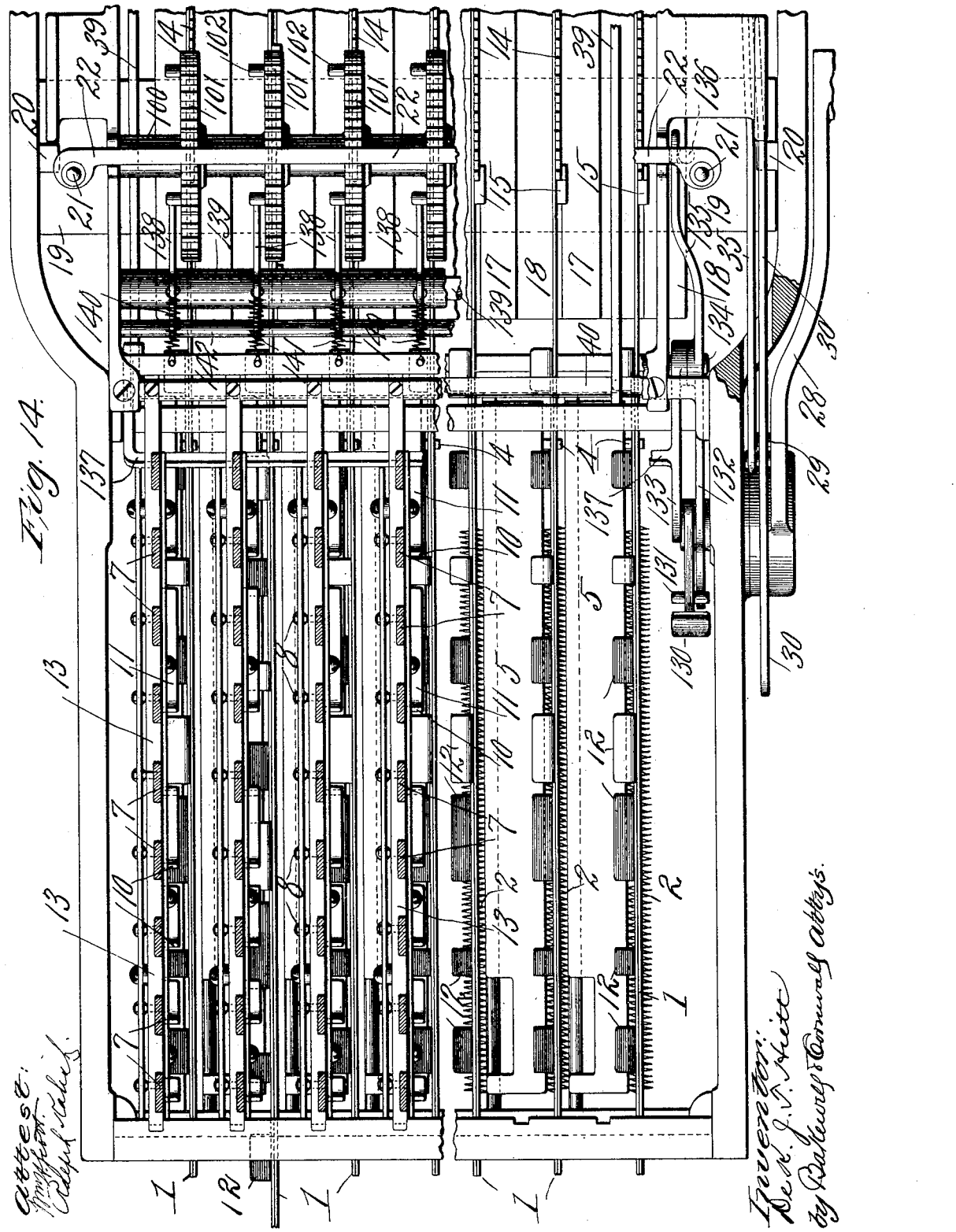

No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 13.
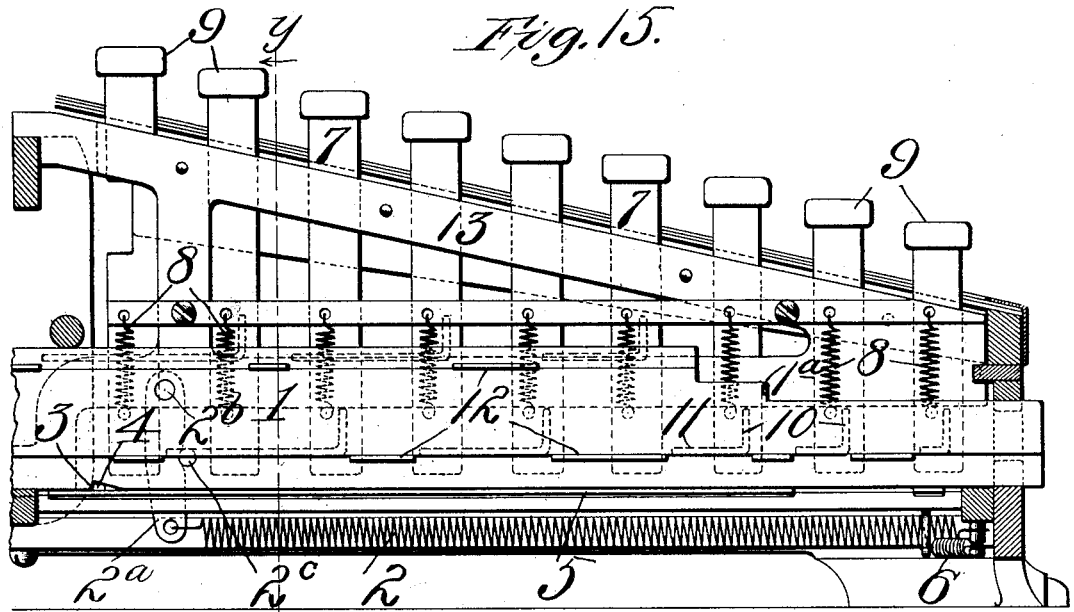
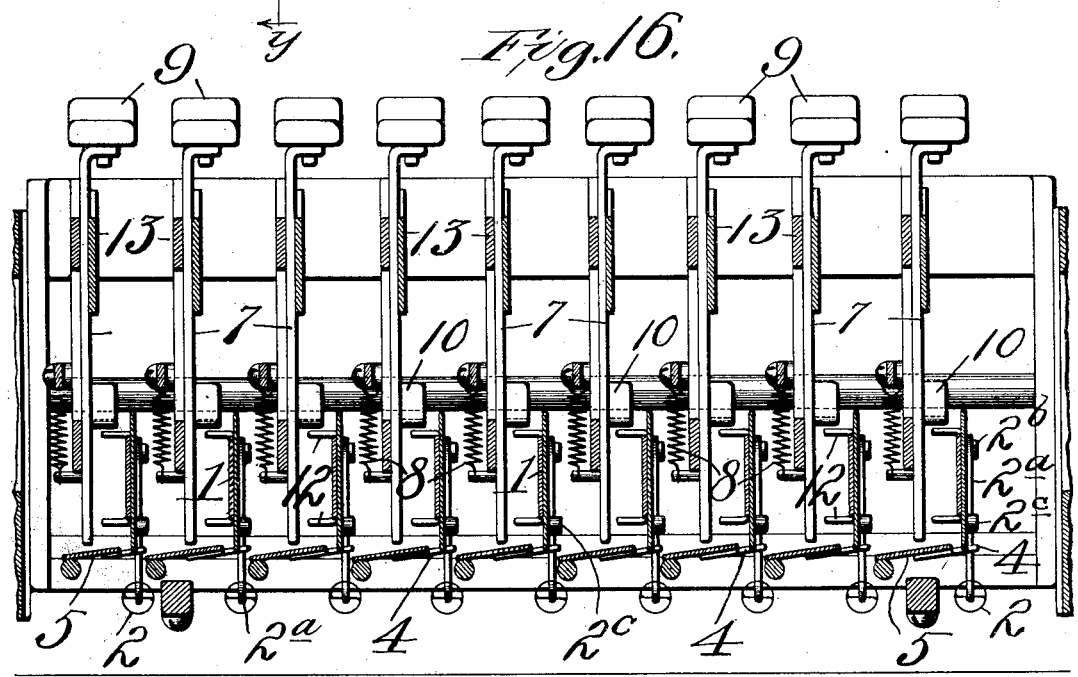
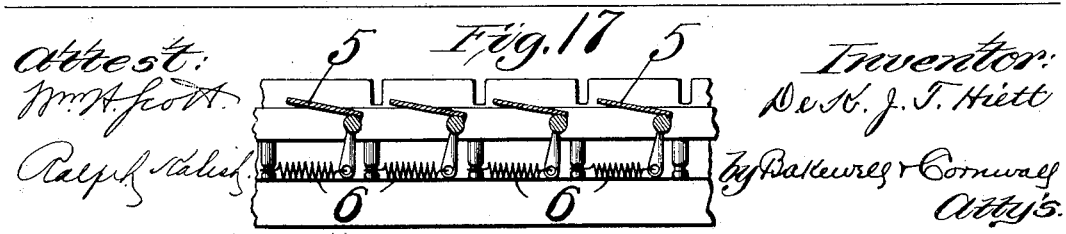

No. 638,118. Patented Nov. 28, 1899.
DE KERNIEA J. T. HIETT.
CALCULATING MACHINE.
(Application filed Nov. 26, 1897.)

(No Model.) 15 Sheets—Sheet 14.

No. 638,118. Patented Nov. 28, 1899.
DE KERNIEA J. T. HIETT.
CALCULATING MACHINE.
(Application filed Nov. 26, 1897.)
(No Model.) 15 Sheets—Sheet 15.

United States Patent Office.

DE KERNIEA J. T. HIETT, OF ST. LOUIS, MISSOURI, ASSIGNOR TO THE UNIVERSAL ACCOUNTANT MACHINE COMPANY, OF SAME PLACE.

CALCULATING-MACHINE.

SPECIFICATION forming part of Letters Patent No. 638,118, dated November 28, 1899.

Application filed November 26, 1897. Serial No. 659,793. (No model.)

*To all whom it may concern:*

Be it known that I, DE KERNIEA J. T. HIETT, a citizen of the United States, residing at the city of St. Louis, State of Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1:
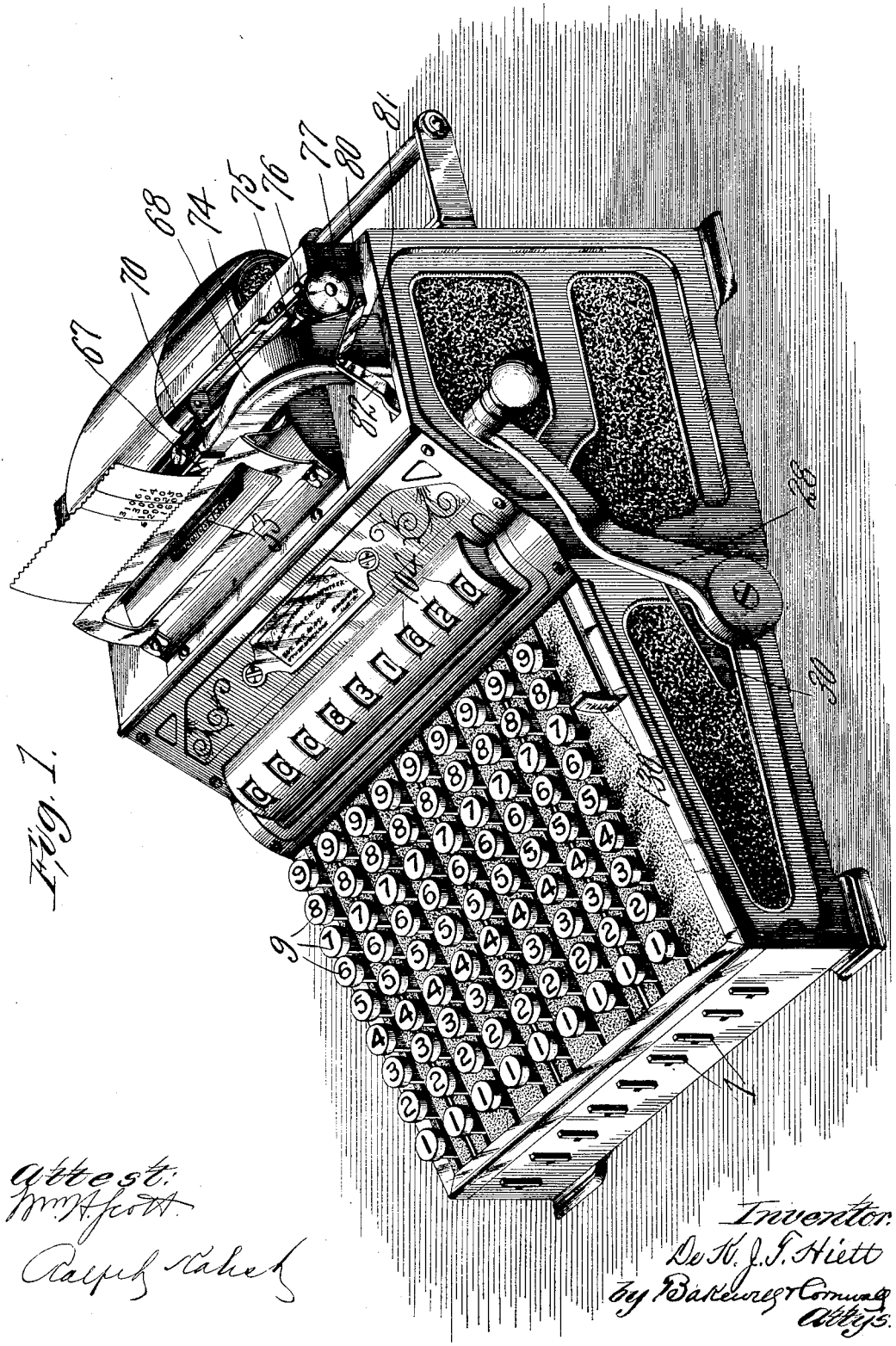
Figure 7:
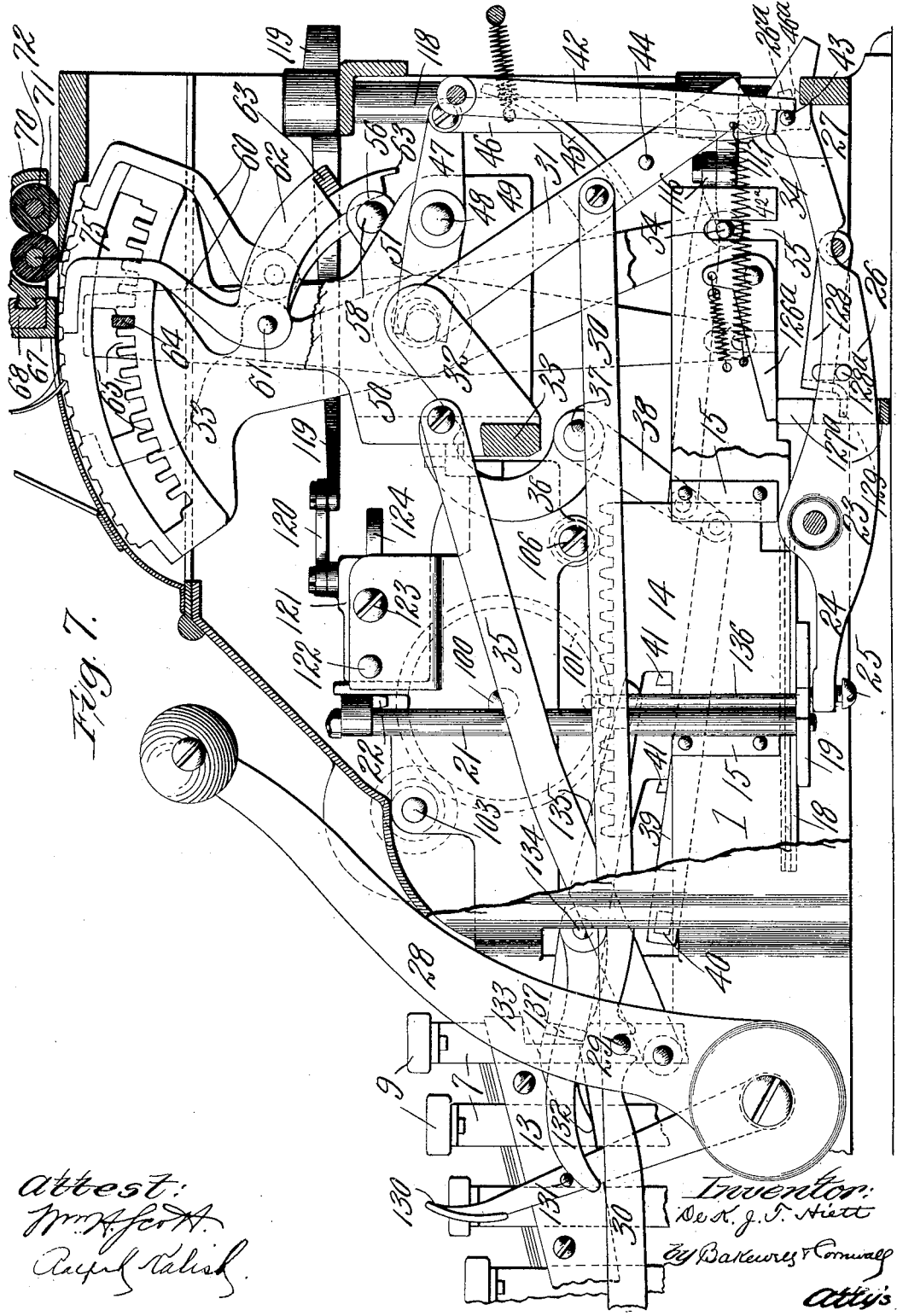
Figure 8:
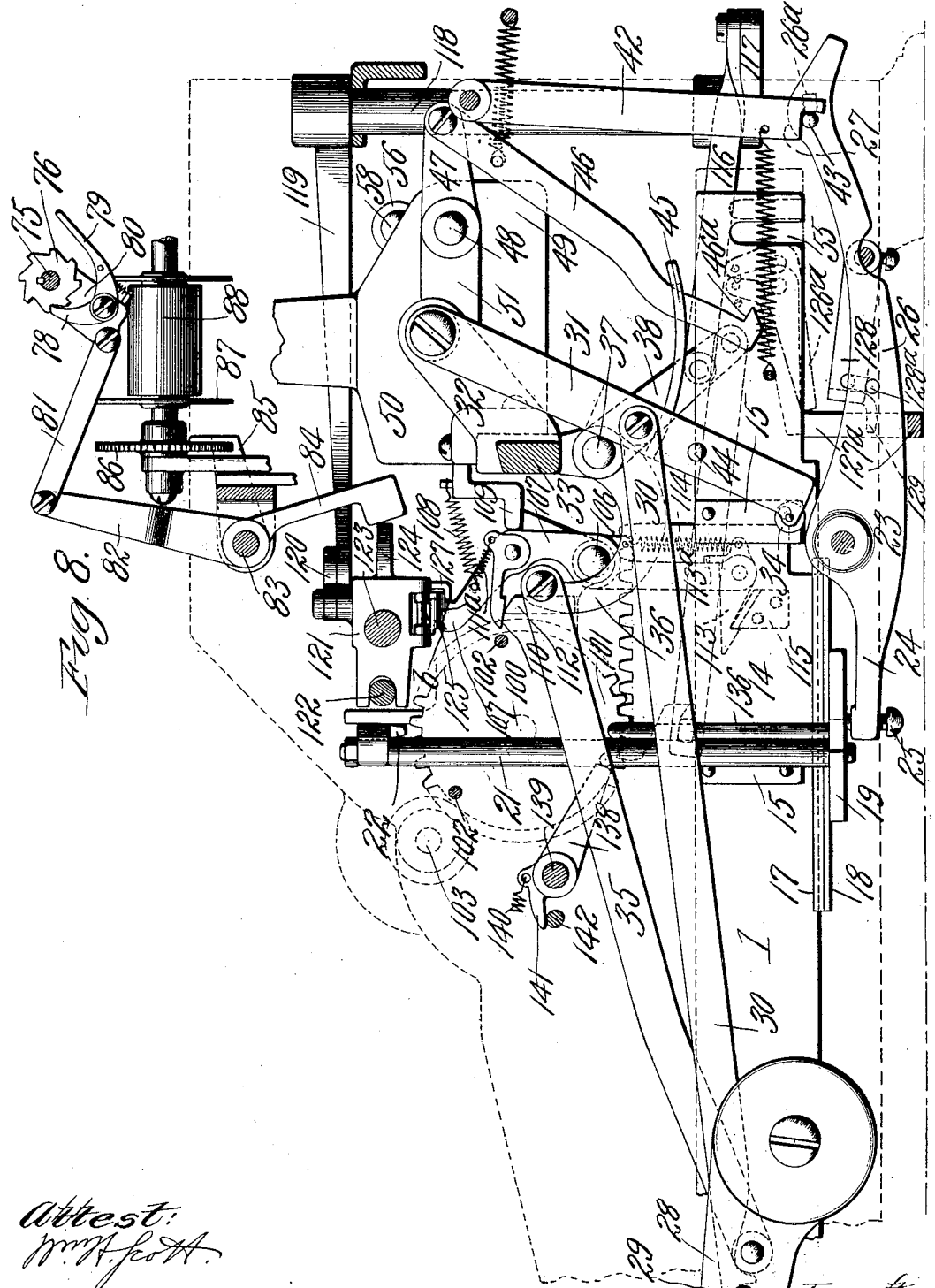
Figure 9:
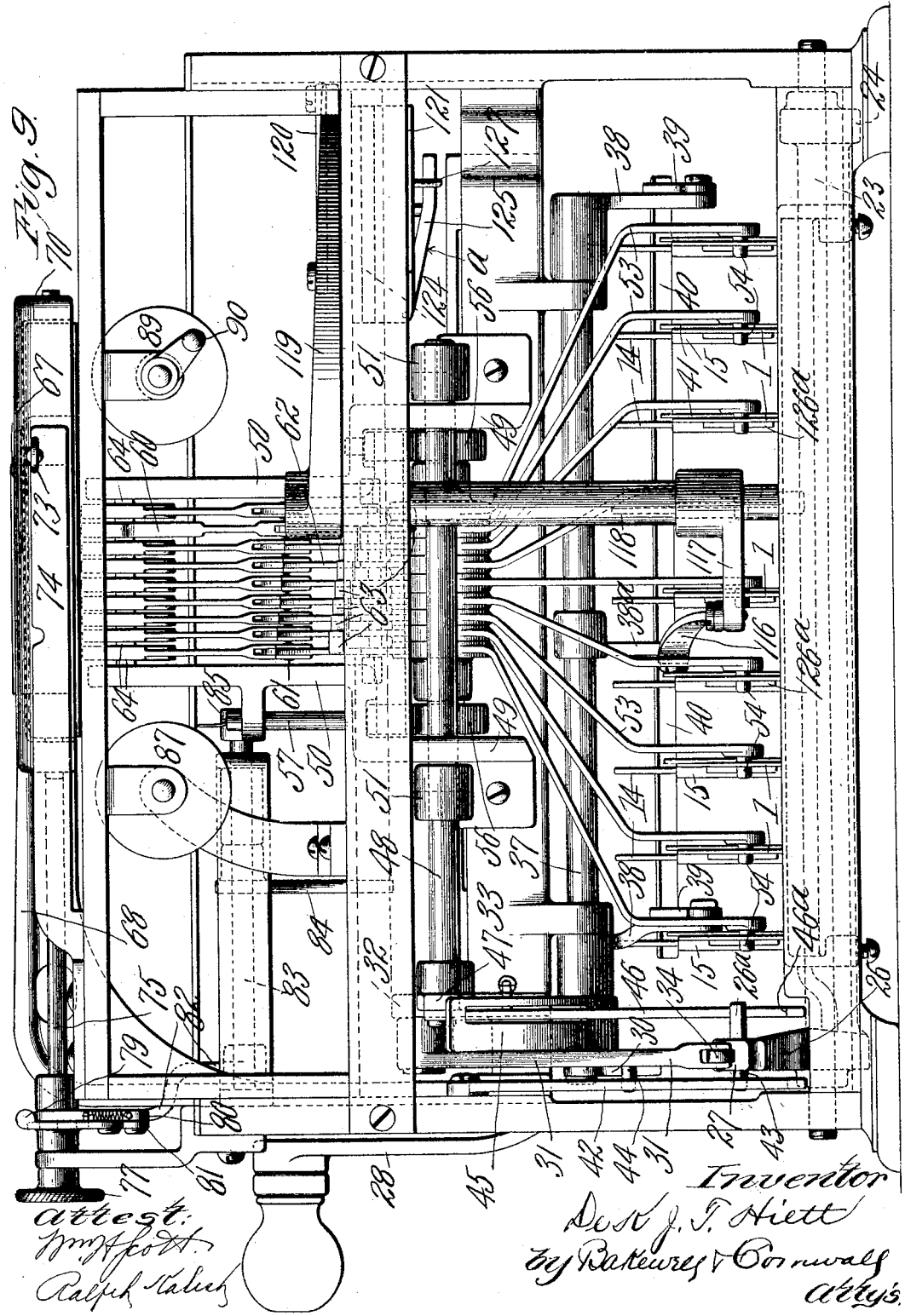
Figure 10:
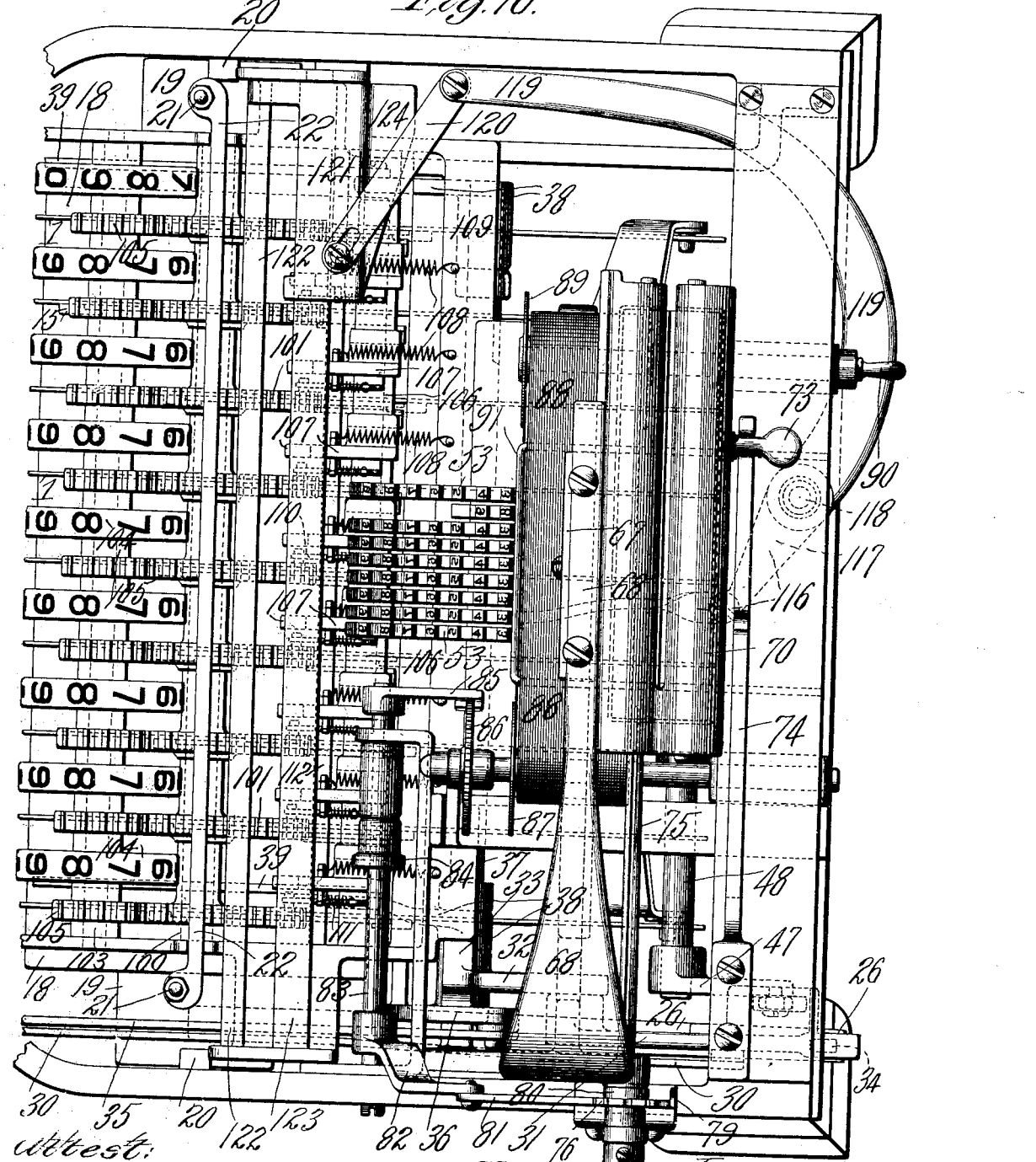
Figure 11:
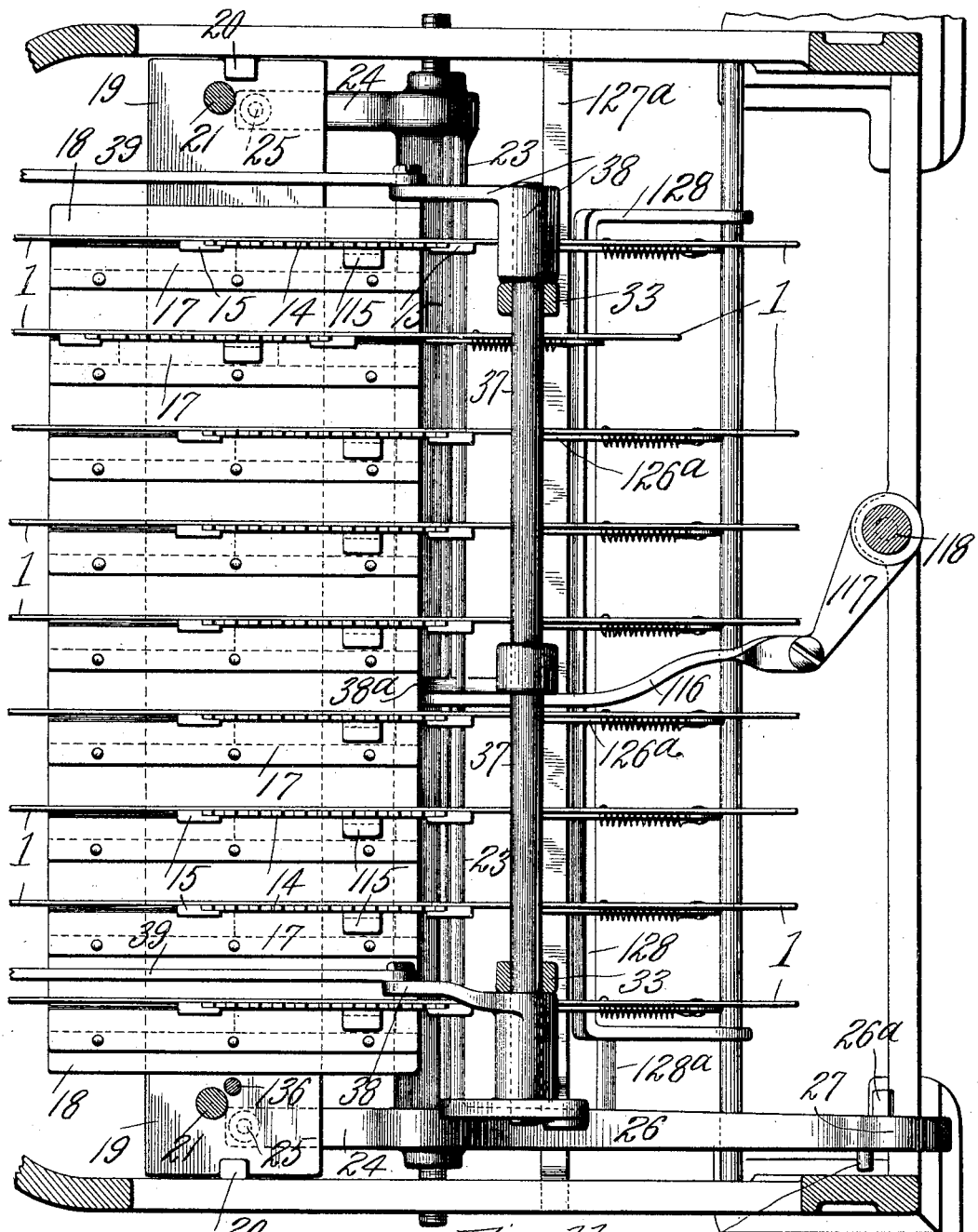
Figure 12:
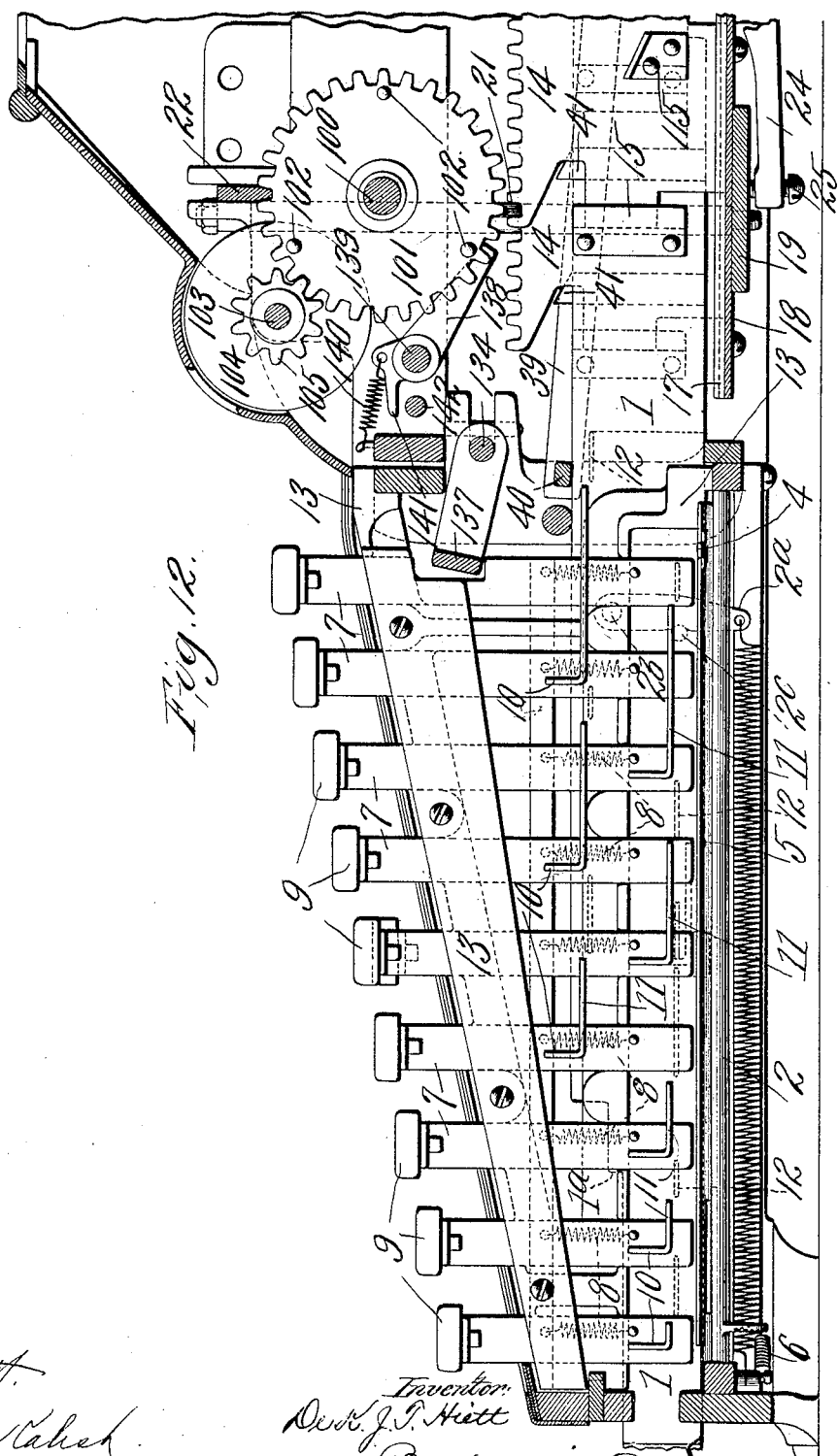
Figure 18:
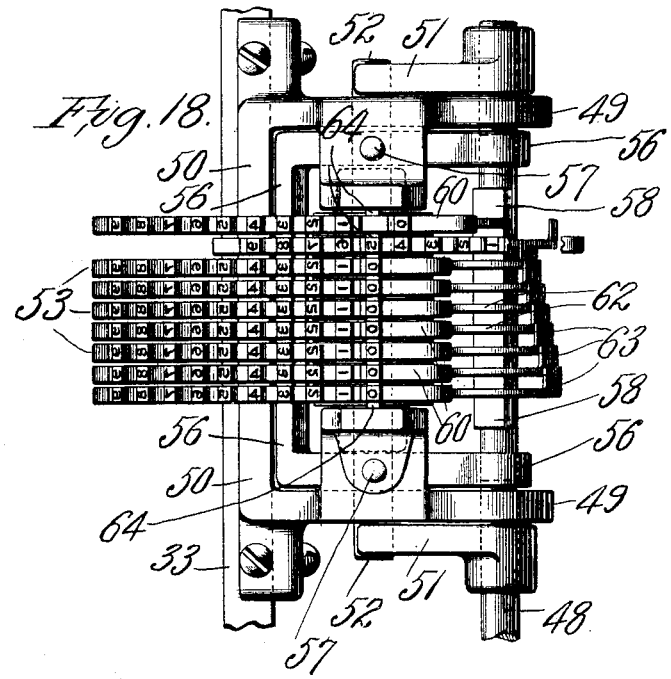
Figure 19:
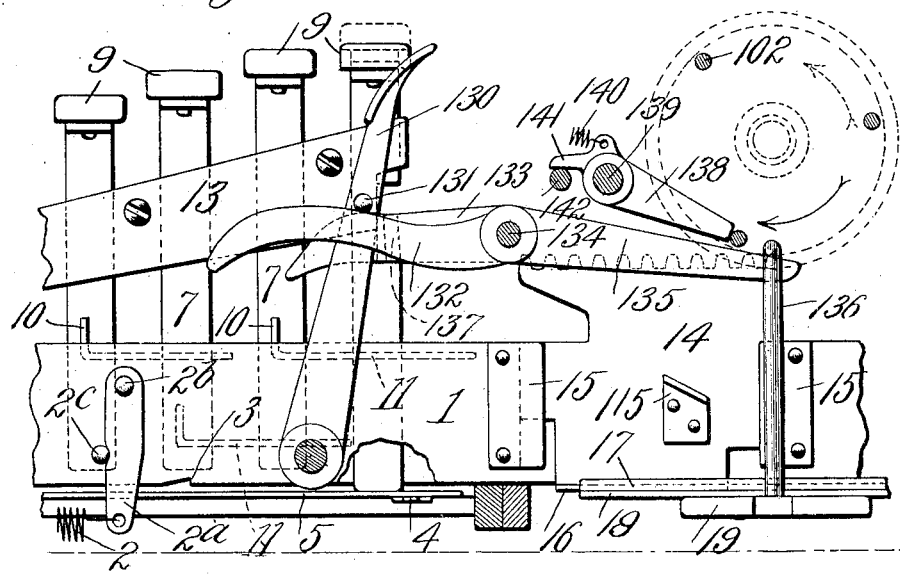
Figure 20:
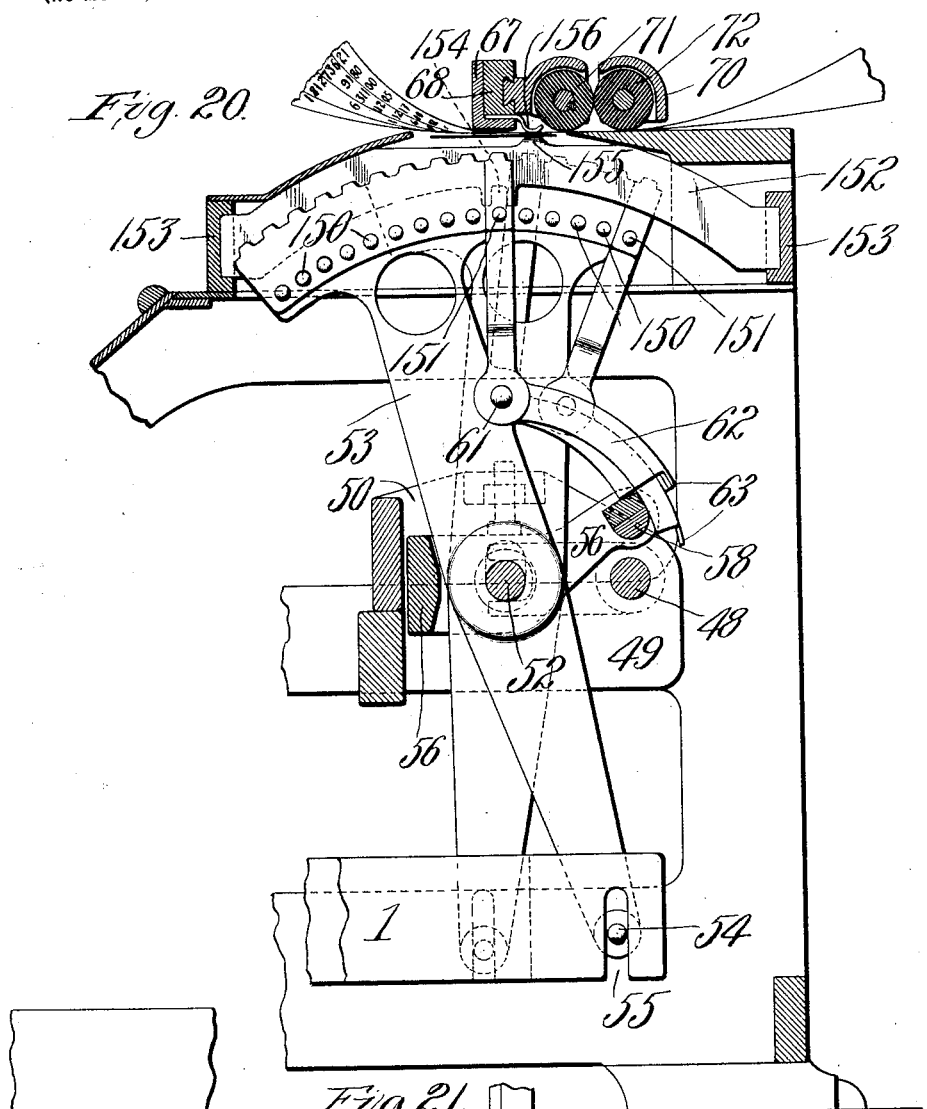
Figure 21:
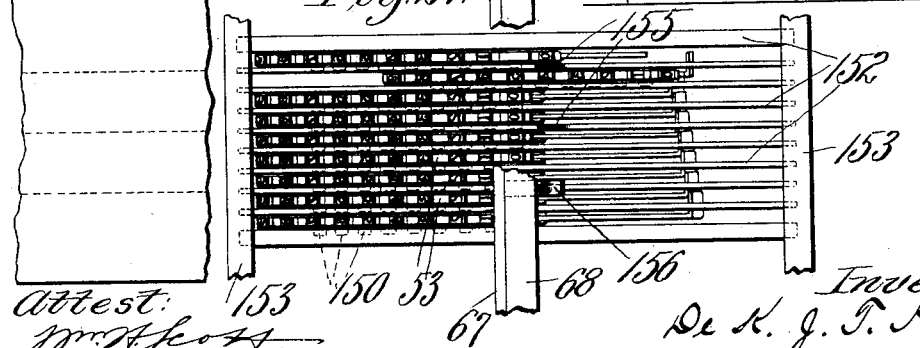

Figure 1 is a perspective view of my improved calculating-machine. Fig. 2 is a longitudinal sectional view through the same. Fig. 3 is a side elevational view of the rear portion of the machine, the near side wall of the frame being removed in order to show the interior mechanism and some of the parts being shown in section. Fig. 4 is a front elevational view of the traveling device for carrying or transferring numbers from one of the adding-wheels to the next adding-wheel in advance when the number added to any of said adding-wheels exceeds nine. Fig. 5 is a bottom plan view of said carrying device. Fig. 6 is an enlarged sectional view through the rear portion of the machine, showing one of the rack-bars moved forward after the "5" key has been operated, the remaining parts being in their normal position. Fig. 7 is a view illustrating the rear portion of the machine, some of the parts being shown in elevation and the remainder in section. This view shows the position of the parts at the first movement of the handle, the printing-segments making their impression on the paper. Fig. 8 is a view illustrating the position of the moving parts when the operating-handle is in its extreme forward position. Fig. 9 is a rear elevational view. Fig. 10 is a top plan view of the rear portion of the machine. Fig. 11 is a plan view showing the rear ends of the rack-bars and the upper portion of the machine, a great number of the moving parts being omitted. Fig. 12 is an enlarged longitudinal sectional view illustrating the front end of the machine and showing key 5 in the eighth series from the right depressed and its rack-bar in a forward position. In this view the handle has not yet been operated. Fig. 13 is a sectional view looking toward the rear of the machine, taken on line *x x*, Fig. 3. Fig. 14 is a plan view of the keyboard, some of the key-shanks being illustrated in section, while in the lower portion of said figure the key-shanks and their supporting-frames are entirely omitted. Fig. 15 is a sectional view through the keyboard as seen from the left side of the machine. Fig. 16 is a sectional view through said keyboard, taken on line *y y*, Fig. 15, and looking toward the rear. Fig. 17 is a detailed view illustrating the manner of elevating the devices which retain the rack-bars in their normal position. Fig. 18 is a plan view of the printing-segments and their elevating-frame, and Fig. 19 is a detailed view illustrating the method of operation of the total-key and its associate parts. Fig. 20 is a detailed view illustrating a modified form of printing-segments, and Fig. 21 is a top plan view of the same.

This invention relates to a new and useful improvement in calculating-machines, the object being to construct a machine of the character described in a simple and cheap manner with a view to compactness of the parts and resultant accuracy of the mechanism.

One of the prime objects of this machine is to so arrange the parts relative to each other that they are each positively actuated to perform their several functions, no momentum or other unreliable medium being depended upon to effect any of the necessary movements of the levers, cranks, or wheels in the machine.

The principle of operation of the machine shown in the drawings may be briefly described as follows: Assuming that it is desired to print and find the total of a column of figures, the figures forming the first item are set up on the keys forming the keyboard—that is, if the item were four thousand three hundred and seventy-five the key marked "4" in the fourth series would be pressed down, the key marked "3" in the third series would be pressed down, the key marked "7" in the second series would be pressed down, and the key marked "5" in the first series would be pressed down. When these keys are pressed down, they set up stops and release the trips which held back the spring-actuated rack-bars. Thus the rack-bars move forward a distance corresponding to the position of the depressed keys. The operating-handle is now moved forward, its first function being to positively engage the rack-bars with the adding mechanism. Its next function is to cause the printing-segments, which are connected to the rack-bars, to move up and print the amount set up in the machine on a strip or piece of paper. The next function of the operating-handle is to withdraw the printing-segments from the paper and restore the rack-bars to their normal position, which places the sum set up on the keyboard in the adding mechanism. The operating-handle then actuates certain feeding devices to feed the paper being printed upon and to space said item from the next item to be printed. The handle will have by this time reached its forward limit of stroke. In its return movement a carrying device will sweep along the adding mechanism, and if more than nine has been added to any of the wheels of the adding mechanism a stop or finger will have been released, which is in the path of said sweep, which thereby actuates said finger, causing the next adding-wheel in advance to be moved one notch. The final movement of the handle to the rear restores the parts to their normal position.

After the several items have been placed in the machine and printed on the strip of paper should it be desired to strike a total a "total-key," as it is called, is moved to the rear, which causes the rack-bars to first engage the adding mechanism, said rack-bars then moving forward, rotating said adding-wheels in a direction opposite that which they were rotated in the normal operation of the machine until said adding-wheels are arrested by a yielding stop placed in the path of a pin or pins carried by said wheels. The printing-segments, being connected to the rack-bars, are likewise actuated, so that they will form a printing-line corresponding to the total of the numbers placed in the machine and printed on the paper. Moving the handle forward a very short distance will now cause the total to be printed on the strip of paper, and if it is desired to clear the machine of the example set up in it and restore the adding mechanism to zero the total-key is moved forward, which releases all the rack-bars and permits said rack-bars to move to their extreme forward position, after which the forward movement of the handle will restore the rack-bars and clear the machine of the example set up in it. In this connection, if it is not desired to print the total a second time, the handle being in its rear position, I provide a lever extending outside the casing, which may be released from the operating-handle and in that way disconnect the printing mechanism from the handle during the time that the machine is being cleared of an example.

The essential features of my invention reside, first, in the novel construction and arrangement of the key-stops and a plurality of coöperating stops on the rack-bars, whereby when a key is actuated it sets up a stop for the rack-bar and trips said rack-bar, whose stops lock said key in its lowered position, said stops also locking the remaining keys of that series in their elevated position; second, in the novel construction and arrangement of the vertically-movable racks, the means for moving said racks vertically into engagement with the adding mechanism, and an operating-handle for restoring the rack-bars to their normal position after their engagement with the adding mechanism to add an item in said adding mechanism; third, in the novel construction and arrangement of the transferring device, which coöperates with the adding mechanism and with the rack-bars for transferring numbers from one adding-wheel to the next adding-wheel in advance; fourth, in the novel construction and arrangement of the transferring device, the adding mechanism, and the paper-feeding mechanism, which is actuated by said transferring device; fifth, in the novel construction, arrangement, and combination of a rocking frame for throwing the rack-bars into engagement with the adding mechanism and effecting the printing of the numbers set up on the keyboard; sixth, in the novel construction of the printing-segments, in combination with means for engaging and alining said printing-segments in their movement to make an impression upon the paper; seventh, in the novel construction and arrangement of the laterally-adjustable paper-feed rollers, whereby it is possible to print two or more columns of figures on a piece of paper or leaf of a book, &c.; eighth, in the novel mechanism for obtaining a total and clearing the machine of an example; and, finally, the invention consists in the novel construction, arrangement, and combination of the several parts of the machine, all as will hereinafter be described, and pointed out in the claims.

Referring now to the drawings and particularly with reference to Figs. 12 to 17, 1 indicates what I shall term a "sliding bar." This bar is mounted in suitable guides in the framing of the machine and is connected to a spring 2, said spring exerting a constant tendency to pull the bar forward. Each bar is formed with a shoulder 3, preferably on its lower edge, with which shoulder coöperates a spring-pressed projection 4, as shown more clearly in Fig. 16. This projection extends from a pivoted wing 5, which is held in an elevated position by springs 6, as shown in Fig. 17.

7 indicates the shanks of the keys, which are held in an elevated position by springs 8. These key-shanks carry heads 9, which are preferably numbered and arranged as shown in Fig. 1, where it will be seen that they are numbered from "1" to "9," the keys so numbered forming what I shall term a "series." Each key carries a stop, comprising a vertical portion 10 and a horizontal portion 11, with the exception of the shanks of the "9" keys, which are not provided with stops, because when any of said "9" keys are actuated the rack-bars move to their forward limits.

The bars 1 are provided with a number of stops or projections 12, which coöperate with the key-stops 10 11. As seen in Fig. 16, the bars 1 are made of thin metal, and the projections 12 are formed by bending over the wings or edges on another strip of metal, which is riveted to said bars. Projections 12 are preferably formed so as to travel in two horizontal planes, thus permitting an arrangement of the key-stops 10 11 such as shown in Fig. 12, which will enable a proper coöperation with their respective stops 12 on the bars 1. By this I mean that the key-stops on keys 1, 2, and 3 are near the lower ends of the keys, while the key-stops on keys 4 to 8, inclusive, are staggered. I also prefer to arrange each series of keys in a removable frame 13, whereby in the event of any disorder in the operation of the keys or their associate parts in a series said frame may be removed and replaced without disturbing the remaining keys of the keyboard.

Assuming that key 5 has been depressed, as shown in Fig. 12, it will set up its stop, as shown by the dotted lines, or, in other words, place its stop in the path of one of the projections 12 of its coöperating bar. All the keys of a series are arranged over a wing 5, so that when any of said keys are depressed they will depress said wing, disengaging the projection 4 from the shoulder 3, permitting the bar 1 to move forward until one of its projections 12 engages the vertical wall 10 of the stop of the depressed key, after which when the key is released instead of rising under the tension of its spring 8 the horizontal portion 11 of the key-stop will engage the stop 12 and hold the key in its depressed position. This is advantageous in that the operator may know which keys have been depressed when an example has been set up and before it is placed in the machine. If a mistake has been made, it may be corrected before placing the sum in the adding mechanism of the machine if the actuated bar of the series of keys in which the mistake occurs is pushed back before the handle is operated. This can be done by the operator with no trouble, the key remaining in its depressed position by reason of the length of the horizontal portions 11 of its stop, which is commensurate with the distance of the movement of the bar when the key is depressed, thereby keeping the key down until the projection 4 is ready to engage the shoulder 3. It will be noticed that key 1 has a short horizontal portion 11, because the bar moves but a short distance when this key is depressed, while key 2 has a longer projection 11, and so on up to key 8. The projections 11 practically correspond with the length of the distance of movement of the number of teeth on the racks carried by the bars which are moved past a given point on the adding-wheels when any of the keys are depressed. It will also be noticed that when any one of the keys of a series is depressed the projections 12 pass over the portions 11 of the key-stop immediately that the trip 4 releases the bar. This prevents the key from rising and taking its stop out of the path of the projection 12 on the bar, which would be a serious objection. To illustrate, should the key 1 be quickly struck and there was no proper coöperation between its stop 10 11 and the projection 12 on the bar 1 the key would rise and the bar move the full forward stroke, causing nine to be added and printed in the machine instead of the desired number, one. Again, all of the projections 12 when a bar is actuated with the exception of the projection 12, which passes over the portion 11 of the depressed key, move under the portions 11 of the keys, which locks said keys in their elevated position and prevents them being depressed or disturbing in any manner the depressed key. When the key 9 is depressed, as there is no provision on said key to limit the forward movement of the bar 1, said bar moving the extreme distance of its forward stroke, I preferably provide a shoulder $1^a$ near the forward end of said bar and on its upper edge, which engages the front wall of the framing of the machine, thus forming a stop.

The projection $2^a$, to which the spring 2 is connected at its rear end, is preferably pivoted at $2^b$, its lower end engaging with a stud or projection $2^c$, fixed to the bar 1. The object of so pivoting this projection $2^a$ is to enable it to swing back out of the way when the bar is introduced into the machine.

14 indicates a rack secured to the bar 1 by means of guides 15, which permit said rack to move vertically relative to the bar which carries the same. The lower ends of these racks 14 are provided with lateral guiding projections 16, which pass under suitable guideways 17, mounted on a plate 18, as best shown in Fig. 13. This construction permits the racks 14 to move forward or backward with the bars to which they are respectively connected, but by reason of the sliding connection 16 17 with the plate 18 they are practically locked to said plate so far as vertical movement is concerned. Plate 18 is secured to a transversely-disposed bar 19, whose ends are preferably grooved to receive vertical guiding-ribs 20, secured to the side framing of the machine, as shown in Fig. 11.

21 indicates two posts extending up from the ends of the bar 19, said posts being connected at their upper ends by a locking-bar 22, which extends across the adding mechanism and coöperates with the adding-wheels in a manner to be hereinafter described. This construction, comprising, as it does, the cross-bar 19 and the locking-bar 22, which are connected at their ends by the posts 21, makes a very rigid framing, which under certain operations of the machine is moved vertically to accomplish the engagement of the racks 14 with the adding-wheels and the unlocking or release of said adding-wheels by the locking-bar 22 when said racks are in engagement therewith.

23 indicates a rocking frame which is pivoted in the side framing of the machine, said frame being provided with arms 24, which extend forwardly on each side to points beneath the ends of bar 19, said arms 24 preferably carrying set-screws 25, which bear against the under side of the bar 19 to raise the same and its associate parts whenever the frame 23 is rocked. The set-screws 25 may be adjusted to accommodate the arms 24 to the bar 19.

26 indicates an arm which projects rearwardly from the rocking frame 23, and preferably at the right side of the machine. This arm 26 is provided at its extreme rear upper end with a cam portion or curved face 27, whose function will hereinafter be described. Whenever this arm 26 is depressed, the frame 23 is rocked, elevating the bar 19, which raises the racks 14 into engagement with the adding-wheels and raises the locking-bar 22 out of engagement with the teeth of said adding-wheels.

28 indicates the operating-handle of the machine, which is preferably pivoted on the outside of the side framing of the machine. This operating-handle carries an inwardly-projecting pin 29, to which is detachably connected a rod 30, which projects through an opening in the side framing of the machine, as shown in Figs. 1, 3, 7, and 14. This bar 30 is connected at its rear end to an arm 31, which is mounted on a lug 32, preferably formed on a casting 33, which extends transversely the machine. Arm 31 carries at its lower end a roller 34, which coöperates with the cam-face 27 of arm 26 and depresses said arm 26 whenever the handle is moved forward and the rod 30 is connected to the handle. Of course when the rod 30 is disconnected from the handle the arm 31 and the parts which it actuates remain stationary.

35 indicates a rod pivoted to the handle 28 and connected at its rear end to a crank-lever 36, which is mounted on a cross-shaft 37, extending practically across the machine. This cross-shaft 37 carries two crank-arms 38, at whose ends are pivotally connected links 39, whose forward ends carry a cross-bar 40, operating above the bars 1 and coöperating with stops 41, secured to said bars to restore said bars and their carried racks to their normal position when the handle 28 is moved forward.

42 indicates an arm pivoted to the side framing of the machine and formed with a stepped lower end which coöperates with a lateral projection or pin 43, extending from the rear end of the arm 26. A spring 42ª, having its front end attached to the side framing of the machine, tends to normally hold arm 42 in a forward position against a pin 43, or, as shown in Fig. 7, when said arm 26 is depressed to move the arm 42 forwardly until pin 43 is below the lower end of the arm 42, when the arm 26 is locked in its lower position and prevented from rising.

Arm 31 carries a laterally-projecting pin 44 for restoring the arm 42 to its normal position, thereby releasing the arm 26 when arm 31 is in its rearmost position, as shown in Fig. 3. Arm 31 also carries a slotted extension 45, which coöperates with a hook-bar 46. This hook-bar 46 is pivoted at its upper end to a crank-arm 47, mounted on a cross-rod 48, having bearings in suitable lugs 49, extending from a frame 50, which is secured to the casting 33. Rod 48 carries two slotted arms 51, operating on each side of frame 50. The lower end of hook-bar 46 is formed with a hook portion 46ª, which coöperates with a projection 26ª at the rear end of the arm 26 of the rocking frame. When said arm 26 is depressed, its projection 26ª strikes the hook 46ª and carries the hook-bar 46 downwardly and elevates the printing-segments to make an impression. The hook-bar 46 is held down, as shown in Fig. 7, until the rear wall of the slotted piece 45 on the arm 31 strikes it, when said hook-bar is moved forwardly, as shown in Fig. 8, disengaging its hook 46ª from the projection 26ª, permitting the arm 26 to rise, its pin 43 then engaging and becoming locked under the arm 42, while the printing-segments are allowed to drop from their elevated or printing position. The object in so locking the arm 26 in its lowered position is to relieve the arm 31 of unnecessary labor, because after it has performed its work, which practically terminates after it leaves the cam-rise 27, it has nothing more to do so far as its roller 34 is concerned, although its slotted extension 45 is operative while said arm continues its forward stroke.

52 indicates a short shaft mounted in the ends of arms 51 and passing through vertically-disposed slots in the frame 50, as more clearly shown in Fig. 2. Shaft 52 forms a pivotal bearing for the printing-segments 53, which are nested thereon, as shown more clearly in Figs. 9, 10, 13, and 18, each of said printing-segments having diverging lower members which are provided with laterally-extending pins 54, engaging slots 55 in the rear ends of the bars 1.

56 indicates a vertically-movable frame which is slidingly arranged within the frame 50, said frame 56 being guided in its vertical movement by guiding-rods 57, which pass through suitable openings in lugs on the frame 50, as shown more clearly in Figs. 9 and 18. Frame 56 also affords bearings for shaft 52 of the printing-segments, besides carrying a bar 58 in rearwardly-extending lugs, which bar coöperates with the tailpieces of the naught-carrying type-frames carried by the printing-segments to actuate said naught-carrying type-frames to print zero-marks to the right of any actuated printing-segment. Each printing-segment carries suitable type or printing characters on its periphery, from "1" to "9," as shown in Figs. 10 and 18. The naught or zero type are carried on separate frames 60, pivoted at 61 to the printing-segments. These pivoted frames 60 have curved tailpieces 62, which when elevated are concentric to the pivotal points of the printing-segments. These tailpieces 62 carry lateral projections 63, which extend over the next tailpiece of the adjacent naught-carrying frame to the left, as shown more clearly in Figs. 9 and 18.

64 indicates a locking and alining bar secured in posts extending up on each side of the stationary frame 50. This bar is adapted to coöperate with notches 65, formed in the printing-segments, said notches being correspondingly spaced relative to the printing characters carried by the segment, so that when said segments are elevated to make an impression the bar 64 will enter the notches 65 in the segments, lock the same together, and absolutely aline the printing-type, thus preventing an irregular line of printed characters.

A platen 67, against which the printing characters strike, is arranged on an arm 68, which extends over the printing-line of the printing-segments, as shown more clearly in Figs. 2, 6, 7, and 10. This arm 68 carries a frame 70, in which are mounted two feed-rolls 71 and 72 for feeding the strip of paper to be printed upon. The frame 70 is preferably slidingly mounted by means of a dovetailed groove in the arm 68, in which an extension on the frame 70 runs, as shown more clearly in Figs. 6 and 7. Frame 70 is open at one side, as shown in Fig. 10, to permit a sheet of paper or a leaf of a book to be introduced into the machine from the side to be printed upon, if desired. In addition to this, this frame 70, with its rolls 71 and 72, may be moved laterally across the machine to enable the printing of two or more columns on a single piece of paper. In order to lock the frame when printing a single column on a piece of paper, I preferably pivot a knob 73 thereon, which knob coöperates with notches in a bar 74, as shown in Figs. 9 and 10.

The forward feeding-roll 71 is mounted on a grooved shaft 75 and is positively driven by said shaft in the following manner: On shaft 75 is a ratchet-wheel 76 and also a hand-wheel 77, by which said shaft may be manually rotated. Ratchet-wheel 76 is engaged by a pawl 78, as shown in Fig. 8, said pawl having an extension 79, by which it may be moved out of engagement with the ratchet-wheel when the hand-wheel 77 is turned. Pawl 78 is mounted on an arm 80, pivoted on the shaft 75, said arm 80 being connected by a link 81 to a crank-arm 82, which is mounted on a shaft 83. Shaft 83 carries an arm 84, which is engaged by a cam-face on the carrying or transferring device, and thereby rocked at each complete operation of the handle. Shaft 83 also carries an arm 85, which engages a ratchet-wheel 86, connected to a spindle on which a spool 87 is mounted, said spool carrying inking-ribbon 88, whose other end is wound on a spool 89, said latter spool having preferably connected to it a handle 90, by which the ribbon may be wound when it is about exhausted from said spool 89 and it is desired to fill up spool 89 with a view to aumatically winding said ribbon on the spool 87. A wire frame 91 is also preferably provided for supporting the ribbon over the printing-segments.

I will now describe the adding mechanism and the manner of transferring a number from one of the adding-wheels to another of said adding-wheels whenever one of said wheels has been actuated a distance of nine teeth.

100 indicates a shaft mounted in the side framing of the machine, upon which shaft are loosely arranged a number of gear-wheels 101. In the drawings I have shown these gear-wheels as being provided with thirty teeth. Near the peripheries thereof are laterally-projecting pins 102, there being three pins, which are placed equidistantly apart and projecting to the left side of the wheel, thus making one pin for every ten teeth on the wheels 101.

103 indicates a shaft mounted in the side framing of the machine, said shaft carrying numeral-wheels 104, which are marked on their faces with numbers from "1" to "9" and also the zero-marks. Each numeral-wheel has conjoined to it a pinion 105, having ten teeth meshing with one of the gear-wheels 101. The framing of the machine above these numeral-wheels 104 is provided with sight-openings through which the numbers on the numeral-wheels may be seen, whereby the operator is enabled to determine the total of the numbers placed in the machine, which should correspond with the printed total when the same is struck or printed on the paper.

106 indicates a shaft upon which are mounted a number of independently-movable levers 107, whose construction is clearly shown in Figs. 6, 8, and 13. Levers 107 have springs 108 attached to their upper ends, tending to draw said upper ends to the rear, the other ends of said springs being secured to a cross-bar 109, said cross-bar also acting as a stop for the rearward movement of said levers. Tripping-pawls 110 are pivotally mounted on the upper ends of levers 107, the forward ends of said pawls being normally pressed downward by springs 111, so that said pawls will engage a cross-bar 112 and normally retain the levers 107 in a forward position, as indicated in Fig. 6. The lower ends of levers 107 carry pawls 113, which are normally held in their lowered position by springs 114, a stop 113ª being provided to limit the downward movement of said pawls. These pawls 113 are adapted to coöperate with projections 115 on the racks 14, as hereinafter described.

116 indicates a link connecting a central arm 38ᵃ on shaft 37 with an arm 117, extending from a post 118, mounted in suitable crossbars at the rear end of the machine. Post 118 has at its upper end a crank-arm 119, which I term a "sweep," which is preferably curved, as shown in Fig. 10, so as not to interfere with the other mechanism of the machine when said sweep is operated. The end of sweep 119 carries a link 120, whose other end is provided with a slot through which passes a screw mounted in a transversely-sliding frame 121. Frame 121 slides transversely the machine on suitable guiding rails or rods 122 and 123. This frame 121 carries a cam projection 124 at its rear, which coöperates with the end of arm 84 to rock the same and feed the paper over the printing-segments, as has been heretofore described.

125 indicates a cam pivoted on the under side of frame 121, said cam being held in a lowered position by a spring 126, a stop 127, extending from the lower face of the frame 121, limiting the downward movement of the cam. Spring 126 is secured at one end to a hook-like projection on frame 121 and at its other end to a stud extending inwardly from the cam 125. The point of connection between the spring and the stud being to one side of a straight line from the fixed point of attachment of the spring to the pivotal point of attachment of the cam causes the spring in seeking to establish this position of least resistance to exert a downward pressure on the cam. As shown more clearly in Figs. 4 and 5, it will be seen that this pivoted piece 125, which I have termed a "cam," is provided with two inclined faces, one on its lower side, which I have marked $a$, and one on its side edge, which I have marked $b$. Whenever in the rotation of the gear-wheels 101 said wheels move a distance more than nine teeth, one of their pins 102 will strike the tripping-pawl 110, releasing it from its bar 112, permitting the upper end of lever 107 to be moved to the rear, as shown in Fig. 8. This will place the upper end of said lever in the path of the cam 125. When the frame 121 moves across the machine from right to left, the cam-face $b$ will engage the upper end of lever 107 when said lever has been tripped and reset the same to its normal position, at the same time actuating the next wheel in advance.

When cam 125 moves from left to right, it will not operate the levers 107 by reason of its cam-face $a$ sliding thereover should any of said levers be tripped. It will be obvious that under these conditions wheels 101 can only be rotated when they are in engagement with the racks 14 and that said racks can only engage said adding-wheels when in an elevated position. Whenever any of the levers 107 are tripped, their upper ends move to the rear and their lower ends move forwardly. In moving forward the pawls 113 will be in position to engage the projections 115 on the rack next in advance, as shown in Fig. 8. As the cam 125 will not actuate the levers 107 when moving from left to right and until after the operating-handle has been pulled to its extreme forward position, these levers 107 remain practically stationary until the bars 1 and their carried racks have been restored to their normal position by the bar 40, at which time the pawl 113 engages the projection 115, the act of restoring said racks forcing said projection under said pawl. As the cam 125 moves from right to left its face $b$ will engage the upper ends of all the tripped levers 107 in succession and move the same forwardly until their pawls 110 have caught the bar 112, when said levers will be restored to their normal position. By this operation the pawls 113 of the tripped levers will have moved the next rack-bar one notch to the rear, which is an abnormal position for said rack-bar. This movement of the rack-bar to the rear will move its engaged adding-wheel a corresponding distance, and should said next wheel trip its pawl 110 the lower end of said pawl will move forwardly, where its pawl 113 will engage the projection 115 of the next rack in advance, and the cam 125 will take up said next tripped lever 107, and so on throughout its travel from right to left, moving such of the rack-bars one notch to the rear as the wheels next adjacent to the right exceed the distance of nine teeth in their movement. This abnormal position of the rack-bars will cause a detent 126ᵃ, carried by the rear ends of the rack-bars, to engage behind a bar 127ᵃ, such position of the detent being shown in dotted lines in Fig. 8. The only purpose of this detent 126ᵃ is to take the strain from the pawl 113, as when the rack 14 is lowered out of engagement with the wheels 101 there would be frictional contact between the pawl 113 and the stop 115, and the pawl 113 would soon become worn; but due to the presence of the detent 126ᵃ the projection 115 is free to become disengaged from the pawl 113 immediately after the cam 125 has acted on its lever 107 without wearing said pawl. After the parts are in the position shown in Fig. 8 the movement of the arm 31 to the rear will release the arm 26 by its pin 44 striking the arm 42, forcing said arm to the rear, permitting the arm 26 to rise, which causes the disengagement of the racks 14 from their respective wheels. The rising of this arm 26 carries with it a pivoted stirrup 128, which stirrup elevates all the detents 126ᵃ until they are above their stop-bar 127ᵃ, when the rack-bars will be permitted to move forward a distance of one tooth to their normal position. The forward end of stirrup 128 is connected to the arm 26 by a rod 128ᵃ, as shown in Figs. 2, 7, and 8, and is limited in its upward movement by a stop 129 engaging under the bar 127ᵃ.

I will now describe the manner of printing the total of the items placed in the machine and also how the machine may be cleared of an example and all the adding-wheels restored to zero.

130 indicates a lever which I will term the "total-key." This lever carries a pin 131, which coöperates with the cam-faces of levers 132 and 133. Both these levers are pivoted on a shaft 134, which extends across the machine. Lever 132 is loosely pivoted on said shaft, and lever 133 is fixed to said shaft. Lever 132 has a rearward extension 135, which terminates under a hook 136, mounted on the cross-bar 19. Lever 133 carries a universal releasing-bar 137, which extends across the machine and rests in notches cut in the shanks of all of the "9" keys.

To obtain a total, the lever 130 is moved to the rear, its first action being to engage and depress the lever 132, whose rear end elevates the cross-bar 19, causing all the racks to engage their respective gear-wheels 101. The next action of lever 130 is to depress the lever 133 and cause the bar 137 to engage the shoulders in the shanks of the "9" keys and depress all of the wings 5, which disengages the fingers 4 from the shoulders 3 of the rack-bars, thereby releasing all of said rack-bars, permitting them to move forward and rotate the adding-wheels 101 in a direction opposite that which they were rotated in the normal operation of the machine. Wheels 101 will rotate "backwardly," as it might be called, until one of their pins 102 contacts with a stop 138, which is set up in their path, as shown in Fig. 19. There is a stop 138 for each of the adding-wheels 101, as shown in Fig. 14, said stops being pivoted on a rod 139, their rear ends being elevated into the path of the pins 102 by springs 140, forwardly-projecting fingers 141 being formed on the stops to engage a rod 142 to arrest and limit the upward movement of the rear members of the stops. By this construction when the wheels are rotating in their normal direction the pins depress the stops 138, riding thereover, which in no way affects or retards the rotation of said wheels 101. The normal direction of rotation of wheels 101 is indicated by the dotted arrow in Fig. 19. When, however, the total-key 130 is moved to the rear, as shown in Fig. 19, the racks will engage said adding-wheels, and when the lever 133 is depressed and all the rack-bars released said rack-bars will move forward, rotating the adding-wheels 101 in a reversed direction, as indicated by the full-line arrow in Fig. 19, until one of the pins 102 on said adding-wheels comes in contact with the rear end of its stop 138. To illustrate this operation, I will assume that the first adding-wheel at the right exhibits, through the medium of its coöperating numeral-wheel, the figure "5" through the sight-opening of the machine. The next adding-wheel by its coöperating numeral-wheel exhibits the figure "4," the next the figure "3," the next the figure "2," and the next the figure "1," the rest of the numeral-wheels exhibiting zero-marks. The position of one of the pins on the first adding-wheel will be five teeth from the rear end of its stop 138, and said wheel will be arrested when its rack-bar has moved forward the distance of five teeth. This movement of this rack-bar by reason of the slot-and-pin connection 55 54 between each of the rack-bars and their respective printing-segments also moves its connected printing-segment to place in position the printing character "5" in the printing-line. The next adding-wheel to the left will move but four teeth, and its connected printing-segment will place in position the printing character "4." The next adding-wheel will move but three teeth, the next two, and the next but one, each forwardly-moving rack-bar in this operation throwing into printing position its independently-connected printing-segment, so that said segment will print at the proper time the type-impression indicating the number of teeth the rack-bar traveled or the wheel 101 rotated before being arrested. All of the other adding-wheels will remain stationary, because one of their pins 102 is abutting against the rear end of its stop 138. The rack-bars in engagement with their stationary wheels will obviously not move forward. The handle is now pulled forward merely to effect the printing operation, which is accomplished as soon as the roller 34 passes beyond the rise 27 on the arm 26. If the handle is pulled forward the entire distance and the total-key 130 still retained in its rear position, it will temporarily restore the rack-bars and rotate the wheels, which will then show the total which was printed; but as soon as the handle is pushed back to its normal position the rack-bars will again move forwardly, there being no way in which to retain them in their normal position. After the total has been printed should it be desired to retain the total in the machine the handle is held in its slightly-forward position, so that the roller 34 on the arm 31 will depress arm 26 and keep the racks in engagement with the wheels 101, while the total-key is moved forward and disengaged from the levers 132 and 133. After this the handle may be moved forward to complete its stroke and restore the adding-wheels to their former position, which existed before the total was struck.

From the above it will be seen that whenever the total-key is moved to the rear to strike a total, although the printing-segments will aline to print the total exhibited through the sight-openings in the machine, the numeral-wheels 105 will during the act of printing the total exhibit zero all along the line; but when the handle is operated as before described to still retain the total in the machine said numeral-wheels will again exhibit on their faces the figures representing the total as printed.

Should it be desired to clear the machine of an example, the total-key 130 is pushed to the rear, as shown in Fig. 19, which causes the pins 102 to coöperate, with stops 138, as before described, the numeral-wheels exhibiting zero-marks through the sight-openings. Rod 30 is then manually disconnected from the operating-handle, so that no printing will result from the movement of the handle. The total-key 130 is now moved backward and then forward to first engage the racks with the adding-wheels and cause said wheels to turn to zero, the latter movement being to effect the release of all the rack-bars from the adding-wheels. The handle is now pulled forward, when the bar 40 will restore the rack-bars to their normal position without actuating the adding-wheels or disturbing their position. The total-key being forward and all the "9" keys free in this operation of clearing the machine, the rack-bars will be caught and retained in their normal position when the handle reaches the forward limit of its stroke.

I will now give briefly the operation of the machine. Assume that key 5 in the eighth series from the right has been struck, which is the position of the parts illustrated in some of the figures of the drawings. The shank of this key will carry with it the key-stop 10 11, and the lower end of said key-shank will strike the wing 5, depressing the finger 4 out from the shoulder 3 of the rack-bar, and permit said rack-bar to move forward until one of its stops 12 strikes against the vertical portion of the key-stop 10, which, being above the horizontal portion 11 of said key-stop, will keep said key in a depressed position, and by reason of the remaining stops 12 passing under the horizontal portions 11 of the other key-stops no other key in that series can be depressed. If a mistake had been made by striking the key 5 and key 4 or any other key in that series was intended, it would only be necessary, if it was not desired to clear the machine or to misprint an item, for the operator to manually restore the rack-bar to its normal position by pushing the same back until key 5 is released and the rack-bar caught, when the proper key may be depressed. But to return to the operation of the machine. Key 5 being depressed in the above operation, the rack 14 will have moved forward a distance of five teeth under its associate adding-wheel 101. This movement of the rack-bar will, through the slotted connection between its rear end and the pin on the lower member of the printing-segment, move said printing-segment so that the printing character 5 will be in line with the platen. When this printing-segment is so moved, the tailpiece 62 of the zero-printing frame will ride up over the bar or shaft 58, as shown in Fig. 6, forcing said zero-carrying frame to move up until its upper end, which carries the printing character, will be close to the other printing characters on the segment. The lateral wing or projection 63 of the next tailpiece 62 to the right will be forced up, as shown in Fig. 6, forcing the next zero-printing frame, to which it is connected, to move up into a position where the zero-printing character carried by said frame will be in printing-line with the numeral "5" on the actuated printing-segment, and as each of the zero-printing frames to the right of the one actuated is affected in a corresponding manner all of said zero-printing frames to the right of the printing-segment actuated will be elevated, so as to throw their zero-printing characters into printing-line. This feature is also illustrated in Fig. 18, where it will be seen that the printing-segment at the upper portion of said figure not being actuated shows its zero-type out from the printing-line, while the "5" printing character of the actuated segment is thrown into printing-line, and the zero-printing characters on all the segments to the right, although said segments of themselves have not been actuated, are thrown into printing-line. When these zero-printing frames are thrown up into printing position, as illustrated in Figs. 6 and 18, the curvature of the outer faces of the tailpieces 62 being concentric with the pivotal points of the printing-segments it is possible to operate any printing-segment to the right of the one first actuated and not disturb the printing of zero characters on the pivoted frames attached to such segments as have not been actuated—as, for illustration, the key 5 of the eighth series has been depressed and its printing-segment is thrown into printing position, while all the zero-printing frames have not been affected. If the "9" key of the third series were to be pressed down, its rack-bar would move out and its printing-segment moved into printing-line to print the numeral "9," its zero-carrying frame sliding over the bar 58 and still keeping the zero-carrying frames to the right in an elevated position, those on the left being held up by the zero-printing frame attached to the segment which will print "5." After such keys have been struck as would indicate the proper amount to be added and printed in the machine the handle is to be grasped and pulled forward to the full limit of its stroke, after which it is returned. The operating-handle effects the following results in this movement: On its forward movement the first thing that is done is to cause the arm 31 to depress the arm 26, which will elevate the racks 14 into mesh with the adding-wheels 101, and by the engagement of the projection 26$^a$ on the rear end of said arm 26 with the hook-bar 46 the printing-segments and their associate parts are raised so as to make an impression on the piece of paper to be printed upon. The bar 42 will now lock the arm 26 in a depressed position, which will hold the racks 14 into mesh with the adding-wheels 101, while the slotted extension 45 will strike the hook bar 46 and release the printing-segments from their printing position, permitting them to drop out of contact with the paper. A further movement of the handle toward the front will now cause the cross-bar 40, through the instrumentalities of the rod 34, crank-arms 36 and 38, and links 39, to contact with the stops 41 on the rack-bars and collect all of said rack-bars which may have been actuated, restoring them to their normal position, at the same time actuating the adding-wheels and their associate numeral-wheels to indicate the amount placed in the machine. During the printing of the amount on the paper the sweep 119 starts to move from left to right, but by reason of the lost motion between link 120 and the frame 121 said frame 121 will not be moved until the printing has been effected. After this frame 121 has been moved from left to right the handle will have reached its forward limit and cam 125 will be in position to operate upon any of the levers 107 which might have been tripped, due to the adding-wheels moving more than the distance of nine teeth from the ends of stops 138.

To digress a little from the description of the position of the machine as illustrated in the drawings. Suppose that the numeral-wheels exhibited "9's" throughout the sight-openings, with the exception of the last wheel to the left, which exhibited zero, and the "1" key in the first series was struck and the amount added to the machine. Sweep 119 being at the right side of the machine and its cam 125 in position, after "1" was added in the machine and the handle moved forward but one of the levers 107 would have been tripped, and that would be the lever operated by the first wheel to the right. This lever 107 would be the first one struck by the cam-face $b$ of the cam 125, and as the racks are still in engagement with the wheels 101 said cam-face would move said first lever 107 so that said lever would move the next rack-bar the distance of one tooth to the rear, which would cause the pin on the wheel in mesh with that rack to trip its pawl 110 and release the next or second lever 107. The cam-face $b$ would now operate upon this second lever 107, which would act on the third rack-bar and wheel, and the third wheel would trip its lever, which when restored would act on the fourth rack-bar and wheel, and so on, the tripping and restoring of all the levers 107 continuing throughout the length of the adding mechanism until the numeral "1" was exhibited at the extreme left of the machine, the rest of the numeral-wheels exhibiting naughts. The detents 126$^a$ would by the above operation coöperate with their bar 127$^a$ to relieve the pawls 113 of all strain, and when the pin 44 on arm 31 strikes the arm 42 to release the arm 26 said arm would elevate the stirrup-frame 128 and raise the detents 126$^a$ from behind the bar 127$^a$, permitting all the rack-bars to move forward the distance of one tooth, which distance they had been moved back by the operation of the levers 107 in the act of transferring the excess numbers from one adding-wheel to the next adding-wheel in advance. By this time the frame 121, carrying the cam 125, will have traveled the length of its stroke and the handle will be back to its rearmost position.

After a number of items have been set up and printed in the machine the total is obtained by pressing back the total-key 130, which moves all the numeral-wheels to zero, and when the handle is moved forward a short distance it throws up the printing-segments to print the sum-total of the items placed in the machine, as before described.

If it is desired to clear the machine, the rod 30 is disengaged from the operating-handle and the total-key pressed back and then forward, which will release all the "9" keys, when the handle can be operated and the machine cleared, the numeral-wheels exhibiting naughts throughout.

In Figs. 20 and 21 I have shown a modified form of naught-printing frames, whereby said naught-printing frames are locked in position the same as the printing-segments when a type-impression is made. The printing-segments are mounted in a vertically-movable frame, the same as has been before described; but instead of notches being cut therein to coöperate with the cross-bar to lock and aline the printing-segments I provide said printing-segments with a number of pins 150, which take the place of the notches. The naught-printing frames are also provided with pins 151. 152 indicates a series of spacers arranged between the printing-segments, said spacers being mounted in a suitable frame 153, each of said spacers being provided with a notch 154 in line with the platen to coöperate with the pins 150 on the printing-segments when said printing-segments are actuated or to coöperate with the pins 151 on the naught-printing frames should any of said naught-printing frames be actuated to the right of any actuated printing-segment. By this construction the naught-printing frames are alined and locked in position the same as the printing-segments heretofore described, and by so locking the naught-printing frames in position any wear which might occur on the tailpieces thereof would not throw the naught-type out of printing-line. I also prefer to arrange drag-fingers or projections 155 on the upper faces of the spacers, which are adapted to press the ribbon up against the paper, marking a line when the paper is being fed. These drag-fingers are preferably arranged so as to separate the cents from the hundreds column, and may also be provided to separate the thousands from the hundreds column and the millions from the thousands column, if so desired.

156 indicates a spring-finger secured to the frame 68, which coöperates with the drag-fingers 155 to press the paper down against the ribbon to mark this line. The result of this line marking or ruling is illustrated in Fig. 20, where the paper has been turned up to show the printing-face.

I have shown a machine for use in a decimal system of numbers; but it is obvious that with slight changes other systems could as well be employed—as, for instance, the British currency system, wherein the pins on the first adding-wheel would be placed four teeth apart. The number of teeth on said wheel would be such that four would be a multiple thereof. This is to accommodate the farthing, four of which are equivalent to a pence, the next value in order in this currency. The second or pence adding wheel would have its pins placed twelve teeth apart, twelve being a multiple of the number of teeth on this wheel. This is to accommodate the pence, twelve of which are equivalent to a shilling. There should be eleven keys for this pence-wheel. As twenty shillings make a pound, it would be necessary to make the next adding-wheel with twenty teeth and a single tripping-pin or a number of teeth of which twenty is a multiple, in which event there would be more than one tripping-pin. Nineteen keys, with a corresponding number of stops, should also coöperate with this shilling-wheel. The pound-wheels would be arranged as hereinbefore described.

Other currencies could be added in this machine by making slight changes herein to accommodate the same, as indicated above.

I do not wish to be understood as limiting myself to the exact construction of the several parts comprising my machine as shown in the drawings, as I am aware that many changes can be made therein and in the arrangement and combination of the several parts without in the least departing from the nature and principle of my invention.

Having thus described my invention, what I claim, and desire to secure by Letters Patent, is—

1. The combination with a series of keys, a trip common to all the keys of said series, a sliding bar which is released by said trip when any of said keys in the series are depressed, stops on said keys, and a plurality of stops on the sliding bar for coöperating with said key-stops there being a bar-stop for each key-stop; substantially as described.

2. The combination with a series of keys, of laterally-projecting stops on said keys, said stops comprising a vertical portion and a horizontal portion, a trip which extends under all the keys in said series, a sliding bar which is released by said trip when any of said keys in the series are depressed, and a plurality of stops on said sliding bar for coöperating with the different key-stops there being a separate bar-stop for each key-stop; substantially as described.

3. The combination with a series of independently-movable keys, of a detachable frame in which said keys are arranged, stops carried on said keys, a wing arranged under said frame, and extending its entire length, said wing being common to all of said keys, a catch on said wing, a spring-pressed bar coöperating with said catch and which is released when any of said keys are depressed into engagement with the wing and the catch actuated, and a plurality of stops on said bar which coöperate with the stops on said keys, one of said bar-stops passing over the stop of the depressed key to lock the same in its lowered position, the other stops on the bar passing under the stops of the keys which were not depressed, to lock said keys in their elevated position; substantially as described.

4. The combination with a series of keys, of key-stops arranged thereon, a wing 5 located under said series of keys, means for normally holding said wing in an elevated position, a catch on said wing, and a bar which is adapted to be caught by said wing-catch and held in its rear position; substantially as described.

5. The combination with a bar, of a pivoted member arranged thereon, a stop for limiting the movement of said pivoted member, and a spring attached to the extremity of said pivoted member; substantially as described.

6. The combination with a series of keys, of key-stops arranged thereon, a spring-pressed wing under said keys, a catch on said wing, a bar which is retained in its rear position by said catch, stops on said bar for coöperating with the key-stops when one of said keys is depressed, and a shoulder on said bar for limiting the forward movement of said bar when the highest key of a series is depressed; substantially as described.

7. The combination with a series of independently-movable sliding bars, of a rack mounted on each of said bars and adapted to move at an angle to the movement of said bar, a frame in which the lower ends of said racks are slidingly mounted but locked against independent vertical movement, a cross-bar carried by the frame, an adding mechanism with which said cross-bar normally engages to lock the adding mechanism against movement, and means for actuating said frame to release the adding mechanism and throw the racks into engagement therewith, or lock the adding mechanism and disengage the racks therefrom, substantially as described.

8. The combination with the adding mechanism which is normally locked against movement, of series of keys, a series of forwardly-impelled sliding bars, one bar being common to each series of keys, means operated by the keys to release and set the sliding bars so that said bars will occupy different positions depending upon the location of the operated keys, independently-movable racks carried by said bars, and means for moving said racks into engagement with the adding mechanism after the bars have been arrested in their forward movement, said means simultaneously unlocking the adding mechanism, substantially as described.

9. The combination with independent horizontally-slidable key-bars provided with vertical guideways, of vertically-movable racks fitted in said guideways, a frame provided with horizontal guideways, projections on the racks fitting in said guideways, whereby said racks are capable of horizontal movement conjointly with the independently-movable key-bars in which they are mounted, an adding mechanism, and means for moving all the racks into engagement with the adding mechanism; substantially as described.

10. The combination with independent horizontally-slidable key-bars provided with vertical guideways, of vertically-movable racks fitted in said guideways, a frame provided with horizontal guideways, projections on the racks fitting in said guideways, whereby said racks are capable of horizontal movement conjointly with the independently-movable key-bars in which they are mounted, an adding mechanism, means for moving all the racks into engagement with the adding mechanism, and a bar carried by the rack-frame for engaging and locking the adding mechanism against movement when said rack-frame is in its normal position, or a position in which the racks are disengaged from the adding mechanism; substantially as described.

11. The combination with sliding bars, of movable racks carried thereby, said racks moving at an angle to the movement of the sliding bars, and a rocking frame for moving said racks independent of said sliding bars; substantially as described.

12. The combination with independent slidable bars, of guides formed thereon, racks mounted in said guides, an adding mechanism, a rocking frame in engagement with the racks, and an operating-handle for rocking said frame to move the racks into and out of engagement with the adding mechanism; substantially as described.

13. The combination with a horizontal sliding bar, of vertical guides formed thereon, a rack mounted in said guides and extending below the bar, a horizontal rib formed on the lower end of the rack, a vertically-movable frame formed with a guideway to receive said rib, and permit horizontal movement of the rack relative to the frame, an adding mechanism coöperating with the rack, and means for moving said frame to throw the rack into and out of engagement with said adding mechanism; substantially as described.

14. The combination with sliding bars, of vertically-movable racks carried thereby, an adding mechanism, a rocking frame for elevating the racks into engagement with said adding mechanism, a swinging arm for rocking said frame, an operating-handle, and a detachable connection between said swinging arm and said handle; substantially as described.

15. The combination with sliding bars, of vertically-movable racks carried thereby, an adding mechanism, a rocking frame for elevating said racks into engagement with the adding mechanism, a rearwardly-extending arm on said rocking frame, and means coöperating with said arm for rocking said frame; substantially as described.

16. The combination with the adding mechanism, of racks for actuating said mechanism, a rack-frame for throwing the racks into engagement with the adding mechanism, an arm extending from said frame, means coöperating with said arm to rock said frame, and an arm 42 coöperating with said frame-arm to lock the same in such position that the racks are held and locked into engagement with the adding mechanism, substantially as described.

17. The combination with sliding bars, of keys for releasing said bars, permitting the same to move forward a predetermined distance, racks carried by said sliding bars, and movable at an angle to the movement thereof, an adding mechanism, a frame for moving the racks, independently of the sliding bars, into and out of engagement with the adding mechanism, an operating-handle for actuating said frame, and a restoring device connected to the handle for coöperating with the rack-bars and causing the rotation of the adding mechanism; substantially as described.

18. The combination with sliding bars, of keys for releasing said bars, permitting the same to move forward a predetermined distance, racks carried by said sliding bars, and movable at an angle to the movement thereof, an adding mechanism, a frame for moving the racks, independently of the sliding bars, into and out of engagement with the adding mechanism, a bar 22 on said frame normally in engagement with the adding mechanism to lock the same, said bar releasing said mechanism when the racks are thrown into engagement therewith; substantially as described.

19. The combination with sliding bars, vertically-movable racks carried thereby, stops 41 on said bars, an operating-handle, a cross-bar for engaging the bar-stops, and a connection between said operating-handle and said cross-bar; substantially as described.

20. The combination with sliding bars, carrying stops 41, of vertically-movable racks carried by said bars, a cross-bar for coöperating with said stops, an operating-handle, and a connection between said operating-handle and said cross-bar, said connection comprising rod 35, crank-arms 36 and 38, and links 39; substantially as described.

21. The combination with sliding rack-bars carrying projections 41, keys for releasing said rack-bars and permitting a predetermined advance movement thereof, an operating-handle, a rod 35 connected to said operating-handle, crank-arms 36 38 to which said rod is connected, links 39 connected to members 38 of said crank-arms, and a cross-bar 40 operating above said rack-bars and in advance of their stops, for restoring the rack-bars after they are actuated; substantially as described.

22. The combination with sliding rack-bars, of adding-wheels, an operating-handle for causing the engagement of said rack-bars with said adding-wheels, and means comprising a rock-arm 23 and arm 42 for locking said rack-bars in their engaged position with the adding-wheels while the operating-handle is moved forward and backward; substantially as described.

23. The combination with sliding rack-bars, of adding-wheels, an operating-handle, means connected to said operating-handle for causing the engagement of the rack-bars with the adding-wheels, said means comprising a link 30 detachably connected to the operating-handle, a swinging arm 31 connected to said link, a rocking frame, and an arm extending from said rocking frame which is depressed by said arm 31; substantially as described.

24. The combination with adding-wheels, of sliding rack-bars, an operating-handle, a rod 30 detachably connected to said operating-handle, an arm 31 to which said rod 30 is connected, a rocking frame for causing the engagement of said sliding rack-bars with the adding-wheels, said rocking frame being controlled by the arm 31, and an arm 42 for engaging the end of said rocking frame and locking the same in one of its positions; substantially as described.

25. The combination with the adding-wheels, of sliding rack-bars, a rocking frame for engaging the rack-bars with said adding-wheels, a pin 43 on said rocking frame, and an arm 42 having a stepped lower end for engaging said pin and locking the rocking frame in a position wherein the rack-bars are engaged with the adding-wheels; substantially as described.

26. The combination with a plurality of printing-segments, of a frame in which said segments are mounted, means for independently actuating said segments, and mechanism for moving said frame and all of its carried segments to effect a type impression; substantially as described.

27. The combination with a plurality of printing-segments, of a movable frame common to all of said segments, means for independently actuating said segments, an operating-handle, and means connecting said handle and frame for moving the latter and its carried printing-segments to make a type impression; substantially as described.

28. The combination with printing-segments and their means of actuation, of an operating-handle, and means connected to said handle for causing said printing-segments to make a type impression, said means permitting the withdrawal of the printing-segments before the operating-handle has completed its movement; substantially as described.

29. The combination with a plurality of printing-segments, of a frame in which said segments are mounted, means for independently actuating said segments, mechanism for moving said frame and all of its carried segments to effect a type impression, and an alining device for locking the segments, when making a type impression, against independent movement; substantially as described.

30. The combination with a plurality of printing-segments, of a frame in which said segments are mounted, means for independently actuating said segments, mechanism for moving said frame and all of its carried segments to effect a type impression, and a stationary alining device, common to all of said segments, for locking them together while a type impression is being made; substantially as described.

31. The combination with a printing-segment, a movable frame in which the same is mounted, means for moving the frame and segment bodily to effect a type impression, a type-carrying section pivoted to said segment, and a bar mounted in the movable frame with which said pivoted section coöperates; substantially as described.

32. The combination with the printing-segments, of naught-carrying type-frames pivotally mounted thereon, lateral projections on the ends of said pivoted frames which extend over the next adjacent segment, notches in said printing-segments, a stationary frame carrying an alining device coöperating with said notches, a movable frame in which said segments are pivoted, said movable frame carrying a bar to coöperate with the naught-carrying type-frames, and means for moving said movable frame, substantially as described.

33. The combination with a movable frame, of a shaft carried by said frame, printing-segments pivotally mounted on said shaft, means for independently moving said segments on the said shaft, and mechanism for bodily elevating said frame, shaft and segments to make a type impression; substantially as described.

34. The combination with a movable frame, of a shaft carried thereby, printing-segments pivotally mounted on said shaft, sliding bars having slot-and-pin connections with said segments, whereby, upon the movement of any one of said sliding bars, its connected segment will be moved a corresponding distance, an operating-handle, and connections between said operating-handle and the frame for bodily elevating all of said segments to make a type impression; substantially as described.

35. The combination with printing-segments, of pivoted naught-carrying frames mounted thereon, a vertically-movable frame in which said printing-segments are pivotally mounted, a bar carried by said vertically-movable frame, said bar coöperating with the naught-carrying frames, and means for moving said frames vertically; substantially as described.

36. The combination with printing-segments, of a vertically-movable frame in which said printing-segments are pivotally mounted, a pivot-shaft for said segments, which shaft extends laterally beyond said frame, and arms for supporting said shaft and for moving the same and the frame vertically; substantially as described.

37. The combination with a vertically-movable frame, of printing-segments carried by said frame, a stationary frame in which said vertically-movable frame is guided, a shaft mounted in said stationary frame, and arms extending from said shaft and engaging the vertically-movable frame; substantially as described.

38. The combination with a movable frame, of a shaft carried thereby, printing-segments pivotally mounted on said shaft, sliding bars having slot-and-pin connections with said segments, whereby, upon the movement of any one of said sliding bars, its connected segment will be moved a corresponding distance, an operating-handle, connections between said operating-handle and the frame for bodily elevating all of said segments to make a type impression, and an alining device engaging the segments in their elevated position to prevent independent movement thereof; substantially as described.

39. The combination with a movable frame, of a shaft carried thereby, printing-segments pivotally mounted on said shaft, sliding bars having slot-and-pin connections with said segments, whereby, upon the movement of any one of said sliding bars, its connected segment will be moved a corresponding distance, type-carrying sections pivoted to said segments, a bar mounted in the movable frame for coöperating with said sections, an operating-handle, and connections between said operating-handle and the frame for bodily elevating all of said segments to make a type impression; substantially as described.

40. The combination with a movable frame, of a shaft carried thereby, printing-segments pivotally mounted on said shaft, sliding bars having slot-and-pin connections with said segments, whereby, upon the movement of any one of said sliding bars, its connected segment will be moved a corresponding distance, type-carrying sections pivoted to said segments, a bar mounted in the movable frame for coöperating with said sections, an operating-handle, connections between said operating-handle and the frame for bodily elevating all of said segments to make a type impression, and an alining device engaging the segments in their elevated position to prevent independent movement thereof; substantially as described.

41. The combination with sliding rack-bars, of adding-wheels, a rocking frame for causing the engagement of said rack-bars with said adding-wheels, printing-segments, means operated by said rocking frame for causing said printing-segments to make an impression, and an operating-handle for rocking said frame; substantially as described.

42. The combination with sliding bars, of printing-segments connected thereto, a rocking frame, a handle for rocking said frame, and means operated by said rocking frame for causing the printing-segments to move vertically to make an impression; substantially as described.

43. The combination with a rocking frame, of printing-segments, a hook-bar which is caught by said rocking frame to elevate the printing-segments to make an impression, and an operating-handle for rocking said frame, said handle, also, disengaging the hook-bar from said frame after the printing-segments have made their impression; substantially as described.

44. The combination with vertically-movable printing-segments, of a rocking frame, a hook-bar which is caught when said rocking frame is depressed, said hook-bar elevating said printing-segments, means for locking said rocking frame in one of its positions, and an operating-handle for rocking said frame, said handle, also, disengaging the hook-bar from the frame; substantially as described.

45. The combination with sliding bars, racks carried thereby, adding-wheels, a rocking frame for causing the engagement of the racks with the adding-wheels, printing-segments connected to said sliding rack-bars, means operated by said rocking frame for taking an impression from the type of said printing-segments, and an operating-handle for rocking said frame; substantially as described.

46. The combination with sliding rack-bars, of means for causing said rack-bars to advance a predetermined distance, adding-wheels, which are normally disengaged from said rack-bars, a rocking frame for causing the engagement of said rack-bars with the adding-wheels, printing-segments which are actuated by said rack-bars, means operated by said rocking frame for taking an impression from the printing-segments, and an operating-handle for rocking said frame, said handle, also, restoring the rack-bars to their normal position and rotating the adding-wheels after an impression has been made from the printing-segments; substantially as described.

47. The combination with a rocking frame, of a hook-bar which is engaged thereby, printing-segments which are moved vertically by said hook-bar when engaged by the rocking frame to make a printing impression, an arm 31 for rocking said rocking frame, and a slotted projection carried by said arm 31 for disengaging the hook-bar from the rocking frame when said arm is moved a certain distance; substantially as described.

48. The combination with sliding rack-bars, of keys for releasing said bars and permitting the same to move forward a predetermined distance, an adding mechanism, means for engaging the adding mechanism with the rack-bars when the latter have reached their forward position, trips in the paths of the several wheels of the adding mechanism, pawls carried by said trips, projections on the rack-bars for engaging the pawl of the next adjacent trip, and mechanism for restoring the trips and actuating their coöperating rack-bars to rotate the meshed adding-wheels; substantially as described.

49. The combination with rack-bars, of an adding mechanism, an operating-handle and associate parts for causing the engagement of the adding mechanism and rack-bars at the commencement of its stroke, and the disengagement of said parts at or about the end of its stroke, trips which are actuated by the several wheels of the adding mechanism respectively, pawls carried by said trips for engaging the next rack-bar in advance, and a sweep operated by the handle to reset the trips and rotate the adding-wheels through the medium of the trip-pawl connection, during the closing movement of the handle and before the adding mechanism is disengaged from the rack-bars; substantially as described.

50. The combination with rack-bars, of adding-wheels, which are adapted to engage therewith, pins on said adding-wheels, a lever which is tripped by said pins, means on the lower ends of said lever for engaging the next rack-bar in advance, and a frame which sweeps across the machine to coöperate with said lever to restore the rack-bars to their normal position, at the same time, moving the said next rack-bar the distance of one tooth to the rear; substantially as described.

51. The combination with rack-bars, of adding-wheels, pins on said adding-wheels, levers which are adapted to be tripped by said pins, and a pivoted cam which sweeps across the machine to coöperate with said levers, carrying numbers from one wheel to another; substantially as described.

52. The combination with rack-bars, of adding-wheels which are adapted to be engaged by said rack-bars, pins on said wheels, pivoted levers which are tripped by said pins, said levers engaging the next rack-bar in advance, a frame which moves across the machine, a cam carried by said frame, and means for sliding said frame across the machine so that said cam can coöperate with said levers when the levers are tripped; substantially as described.

53. The combination with rack-bars, of adding-wheels which are adapted to be engaged by said rack-bars, pins on said adding-wheels, levers 107, pawls 110 on the upper ends of said levers which pawls are adapted to be tripped by the pins on the adding-wheels and release the levers, pawls 113 on the lower ends of said levers, which latter pawls are adapted to coöperate with a projection on the next rack-bar in advance, a frame 121, a pivoted cam carried by said frame for coöperating with the upper ends of the tripped levers, and means for moving said frame and its carried cam across the machine; substantially as described.

54. The combination with sliding rack-bars, of adding-wheels, means for engaging the adding-wheels with the rack-bars, trips which are actuated by said adding-wheels, said trips coöperating with the next adjacent rack-bars, in advance, respectively, so as to move said rack-bars the distance of one tooth, traveling mechanism for restoring said trips, an operating-handle, and mechanism connected to, and operated by, said handle, for throwing the rack-bars into and out of engagement with the adding-wheels and restoring said rack-bars and their trips; substantially as described.

55. The combination with sliding rack-bars, of adding-wheels normally out of engagement with said rack-bars, trips which are thrown by said adding-wheels, said trips being connected to and operating the next rack-bar in advance, a cam which is adapted to coöperate with said trips, a sweep-arm on the end of which said cam is carried, and an operating-handle for engaging the rack-bars with the adding-wheels and restoring the rack-bars, and placing the sweep-arm and its cam in position in one of its movements, the other movement of said operating-handle causing said cam to engage the trips and reset the rack-bars; substantially as described.

56. The combination with sliding rack-bars, of adding-wheels adapted to be thrown into engagement therewith, means coöperating with said adding-wheels and said rack-bars for transferring numbers from one adding-wheel to the next adding-wheel in advance, said means moving the next rack-bar in advance one tooth to the rear, when so transferring said numbers, and a detent carried by the rack-bar for holding the same in such rear position; substantially as described.

57. The combination with sliding rack-bars, of adding-wheels which are adapted to be engaged thereby, a rocking frame for causing the engagement of the rack-bars with the adding-wheels, means coöperating with said adding-wheels and with the rack-bars for transferring numbers from one adding-wheel to the next adding-wheel in advance, a detent on the rack-bars for relieving said transferring means of any strain after said transferring means has performed its work, and mechanism connected to and operated by said rocking frame for releasing said detents; substantially as described.

58. The combination with rack-bars, of detents pivotally mounted thereon, a cross-bar with which said detents coöperate when the rack-bars are in an abnormal position and a pivoted stirrup-frame for disengaging said detents from said cross-bar; substantially as described.

59. The combination with rack-bars, of detents carried thereby, a cross-bar with which said detents coöperate, and a stirrup-frame for elevating said detents above the said cross-bar; substantially as described.

60. The combination with the adding mechanism, of a frame which travels along said adding mechanism, a cam carried by said frame for effecting the transfer of numbers from one adding-wheel to the next adding-wheel in advance, and means for causing the movement of said traveling frame; substantially as described.

61. The combination with the adding mechanism, of a frame 121 which travels along said adding mechanism, a pivoted cam carried by said frame, a swinging arm 119 for causing the movement of said arm, and a link connection between said swinging arm and said frame, said link connection having a slot in one end, whereby lost motion occurs in the initial movement of said swinging arm 119 and before the frame 121 is actuated; substantially as described.

62. The combination with the adding mechanism, of a transversely-moving device for transferring numbers from one adding-wheel to the next adding-wheel in advance, and a paper-feed mechanism which is actuated by said traveling transferring mechanism; substantially as described.

63. The combination with a traveling transfer mechanism, of an adding mechanism with which said transfer mechanism coöperates, paper-feed rollers which are actuated by said traveling transfer mechanism, and a ribbon-feed device which is, also, actuated by said traveling transfer mechanism; substantially as described.

64. The combination with an overhanging arm, of a platen carried thereby, a frame mounted upon and laterally movable relative to said arm, means for locking said frame in its laterally-adjusted position, paper-feeding devices carried by said frame whereby, the paper to be printed upon can be set in different lateral positions, and two or more type arranged side by side to print parallel longitudinal columns on said paper; substantially as described.

65. The combination with two or more type arranged to print side by side, of a support for a sheet of paper adapted to be set in different positions opposite the printing-type, means for moving the support laterally relative to the type, devices for locking the same in such lateral adjusted position, and paper-feeding devices which are operative to feed the paper in the adjusted positions of said support; substantially as described.

66. The combination with two or more series of type, means for bringing any one type of a series into position to print side by side with those of another series, a platen, paper-feeding rolls, means for laterally adjusting said rolls, and means for intermittently rotating said rolls in any position in which they are set, whereby parallel longitudinal columns may be printed upon the paper; substantially as described.

67. The combination with two or more series of type, means for bringing any one type of a series into position to print side by side with those of another series, a platen, paper-feeding rolls, means for laterally adjusting said rolls, devices for locking the rolls in any position in which they are set, and means for intermittently rotating said rolls in any position in which they are set, whereby parallel longitudinal columns may be printed upon the paper; substantially as described.

68. The combination with an overhanging platen, of a frame movable relative thereto, paper-feed rollers carried by said frame, a grooved shaft on which one of said rollers is mounted, and a projection on the roller arranged on the grooved shaft, which fits into the groove whereby, said roller can be adjusted lengthwise, and be positively rotated by, the shaft; substantially as described.

69. The combination with sliding rack-bars, of adding-wheels which are adapted to be engaged thereby, a lever 130 carrying a pin or projection 131, a cam-faced lever 132 coöperating with said pin, a frame which is elevated upon the actuation of said lever 132 to cause the engagement of the rack-bars with the adding-wheels, a cam-faced lever 133 in the path of the pin on lever 130, and rack-bar trips which are moved when the lever 133 is actuated; substantially as described.

70. The combination with sliding rack-bars, of adding-wheels which are adapted to be engaged thereby, a lever 132 for causing the engagement between said adding-wheels and the said rack-bars, and a lever 133 carrying a universal releasing-bar for tripping all of the rack-bars after the engagement between the adding-wheels and the rack-bars has taken place; substantially as described.

71. The combination with sliding rack-bars, of adding-wheels, stops for said adding-wheels, a total-key, a lever adapted to be engaged by said total-key in its initial movement for causing the rack-bars to engage the adding-wheels, a device which is engaged by said total-key in its final movement for releasing all of said rack-bars, and means for moving said released rack-bars to rotate the engaged adding-wheels until said wheels are arrested by their respective stops; substantially as described.

72. The combination with sliding rack-bars, of adding-wheels, stops for said adding-wheels, a total-key, a lever adapted to be engaged by said total-key in its initial movement for causing the rack-bars to engage the adding-wheels, a device which is engaged by said total-key in its final movement for releasing all of said rack-bars, means for moving said released rack-bars to rotate the engaged adding-wheels until said wheels are arrested by their respective stops, and printing-segments operatively connected to and movable with said rack-bars, whereby said segments present printing characters in a single line corresponding to the movement of their respective rack-bars; substantially as described.

73. The combination with sliding bars, vertically-moving racks carried thereby, adding-wheels, which are adapted to be engaged by said racks, stops for said adding-wheels, which stops are effective only when said adding-wheels are rotating in a certain direction, a total-key for moving said racks vertically into engagement with the adding-wheels, said total-key, also, tripping all of the rack-bars after such engagement has taken place, thereby permitting the adding-wheels to rotate until arrested by said stops, printing-segments connected to said sliding bars, and a handle for taking an impression from said printing-segments; substantially as described.

74. The combination with sliding bars, of racks carried thereby, adding-wheels which are adapted to be thrown into engagement with said racks, stops on said adding-wheels, means for throwing said racks into engagement with the adding-wheels, said means also releasing the sliding bars so that the adding-wheels are reversely rotated thereby until arrested by said stops in their "zero" position, and means for disengaging the racks from the adding-wheels for clearing the machine by leaving the adding-wheels in their zero position; substantially as described.

75. The combination with sliding rack-bars, of adding-wheels, stops for said adding-wheels, a total-key for causing the engagement between said sliding rack-bars and the adding-wheels, said total-key, also, tripping all of said rack-bars, printing-segments which are actuated by said sliding bars, an operating-handle, and a detachable rod connected to and operated by said handle for causing said printing-segments to make an impression; substantially as described.

76. The combination with sliding rack-bars, of adding-wheels, stops for said wheels, devices for engaging the rack-bars with the adding-wheels, and releasing said rack-bars, printing-segments connected to said sliding bars, an operating-handle, and a detachable connection between said handle and printing-segments, for rendering the latter inoperative when the rack-bars are disengaged from the adding-wheels; substantially as described.

77. The combination with the adding-wheels, of sliding bars, vertically-movable racks carried by said bars, a rocking frame for moving said racks into engagement with the adding-wheels, a total-key for rocking said frame and causing said engagement, and means operated by said total-key for releasing all of said bars after such engagement has taken place; substantially as described.

78. The combination with the adding-wheels, of sliding bars, vertically-movable racks carried by said bars, a rocking frame for moving said racks into engagement with the adding-wheels, a total-key, a lever operated by said total-key for operating said frame, and an independently-movable lever also operated by said total-key, for releasing all of the rack-bars; substantially as described.

79. The combination with a plurality of independently-movable printing-segments and their means of operation, of naught-carrying frames pivoted to said printing-segments, respectively, but movable independently thereof, lateral projections on said frames which engage and swing the next adjacent pivoted frame or frames to the right, upon the actuation of the segment to which said frame is secured, and a locking device for engaging all of the segments and pivoted frames in printing position, for preventing independent movement thereof; substantially as described.

80. The combination with printing-segments, of pivoted naught-carrying frames mounted thereon, pins on said printing-segments and said naught-carrying frames, and notched spacers for coöperating with said pins to lock said segments and naught-carrying frames in their printing-line; substantially as described.

81. The combination with printing-segments, of pivoted naught-carrying frames mounted thereon, a vertically-movable frame in which said frames are mounted, pins on said printing-segments and said naught-carrying frames, and notched spacer-bars which coöperate with the pins on the segments and the naught-carrying frames when the printing-segments are moved vertically to make an impression; substantially as described.

82. The combination with two or more type arranged to print side by side, of a support for a sheet of paper adapted to be set in different positions opposite the printing-type, means for moving the support laterally relative to the type, devices for locking the same in such lateral adjusted position, paper-feeding devices which are operative to feed the paper in the adjusted positions of said supports, spacers between the type, ruling devices on the spacers, an inking medium interposed between the type, the ruling devices, and the paper, whereby the paper being printed upon is ruled to separate the columns of printed characters; substantially as described.

83. The combination with two or more type arranged to print side by side, of a support for a sheet of paper, means for feeding the paper, spacers 152 between the type, drag-fingers 155 on the spacers, an inking medium over the drag-fingers, and spring-fingers 156 for pressing the paper onto said inking medium and drag-fingers, for marking and ruling the paper longitudinally between the printed characters; substantially as described.

84. The combination with independently-operable pivoted printing-segments, of means for moving the same, spacers between said segments, drag fingers or projections on some of said spacers, said fingers being constantly in the plane of type impression, an inking medium which travels over said fingers, and means for forcing the segments into the printing-plane to make a type impression, said means also permitting the return or withdrawal of said segments from their printing position; substantially as described.

85. The combination with an overhanging platen, of spring-fingers carried thereby, and drag-fingers operating under said spring-fingers to rule the paper; substantially as described.

86. The combination with independently-movable printing-segments and their means of actuation, of stationary spacer-bars arranged between said printing-segments, a platen, and means for ruling or marking the sheet of paper being printed upon; substantially as described.

In testimony whereof I hereunto affix my signature, in the presence of two witnesses, this 19th day of October, 1897.

DE KERNIEA J. T. HIETT.

Witnesses:
HUGH K. WAGNER,
F. R. CORNWALL.